US010371813B2

(12) United States Patent
Furxhi et al.

(10) Patent No.: US 10,371,813 B2
(45) Date of Patent: Aug. 6, 2019

(54) SYSTEMS AND METHODS FOR USING TIME OF FLIGHT MEASUREMENTS FOR IMAGING TARGET OBJECTS

(71) Applicant: Duke University, Durham, NC (US)

(72) Inventors: Orges Furxhi, Sanford, FL (US); Ruoyu Zhu, Durham, NC (US); David J. Brady, Durham, NC (US); Daniel Marks, Durham, NC (US)

(73) Assignee: Duke University, Durham, NC (US)

( * ) Notice: Subject to any disclaimer, the term of this patent is extended or adjusted under 35 U.S.C. 154(b) by 707 days.

(21) Appl. No.: 14/896,375

(22) PCT Filed: Aug. 13, 2014

(86) PCT No.: PCT/US2014/050969
§ 371 (c)(1),
(2) Date: Dec. 5, 2015

(87) PCT Pub. No.: WO2015/023802
PCT Pub. Date: Feb. 19, 2015

(65) Prior Publication Data

US 2016/0154102 A1 Jun. 2, 2016

Related U.S. Application Data

(60) Provisional application No. 61/865,225, filed on Aug. 13, 2013.

(51) Int. Cl.
*G01S 13/89* (2006.01)
*G01S 7/35* (2006.01)
(Continued)

(52) U.S. Cl.
CPC .............. *G01S 13/89* (2013.01); *G01S 7/352* (2013.01); *G01S 13/003* (2013.01); *G01S 13/34* (2013.01); *G01S 13/87* (2013.01)

(58) Field of Classification Search
CPC ................................ G01S 7/352; G01S 13/89
(Continued)

(56) References Cited

U.S. PATENT DOCUMENTS 5,596,313 A 1/1997 Berglund et al.
6,091,354 A * 7/2000 Beckner .............. G01S 13/0209 342/22

(Continued)

OTHER PUBLICATIONS

PCT International Search Report and Written Opinion for PCT International Application No. PCT/US2014/050969 filed Aug. 13, 2014.

(Continued)

*Primary Examiner* — Marcus E Windrich
(74) *Attorney, Agent, or Firm* — Olive Law Group, PLLC

(57) ABSTRACT

An imaging system as disclosed can include multiple bistatic radar sensors configured to transmit electromagnetic waves towards a surface of a target object and configured to measure the electromagnetic waves reflected from the surface of the target object. The imaging system includes a computing device that determines time of flight estimates based on the measured waves. The computing device can draw, within an image model for the target object, multiple candidate surface portions of the surface of the target object based on the TOF estimates and predetermined positions of the bistatic radar sensors. Further, the computing device can assign weights to the candidate surface portions. The computing device can determine points where the candidate surface portions meet with a predetermined probability based on the weights. The computing device is configured to define an estimated surface of the target object in the image model based on the determined points.

23 Claims, 32 Drawing Sheets

(51) Int. Cl.
*G01S 13/00* (2006.01)
*G01S 13/34* (2006.01)
*G01S 13/87* (2006.01)

(58) Field of Classification Search
USPC ........................................................ 342/59
See application file for complete search history.

(56) References Cited

U.S. PATENT DOCUMENTS

| | | | | |
|---|---|---|---|---|
| 6,449,566 | B1 * | 9/2002 | Oeschger | G01N 29/12 342/22 |
| 6,777,684 | B1 * | 8/2004 | Volkov | G01N 21/3581 250/341.1 |
| 7,119,731 | B2 * | 10/2006 | Fleisher | G01S 13/887 342/22 |
| 7,724,175 | B2 * | 5/2010 | Mahler | G01S 7/023 342/22 |
| 7,893,862 | B2 * | 2/2011 | Holly | G01S 13/04 342/175 |
| 8,497,797 | B2 * | 7/2013 | Lee | H01Q 21/06 342/179 |
| 8,836,573 | B2 * | 9/2014 | Yanagihara | G01S 7/412 342/179 |
| 8,884,805 | B2 * | 11/2014 | Tonnich | G01S 13/89 342/22 |
| 8,912,946 | B2 * | 12/2014 | Yanagihara | G01S 13/874 342/22 |
| 2007/0268182 | A1 * | 11/2007 | Bourdelais | G01S 7/411 342/452 |
| 2009/0271146 | A1 * | 10/2009 | Ammar | G01S 7/411 702/155 |
| 2010/0039309 | A1 | 2/2010 | Carter et al. | |
| 2011/0267221 | A1 * | 11/2011 | Brundick | G01S 13/878 342/180 |
| 2013/0082870 | A1 * | 4/2013 | Chambers | G01S 13/90 342/25 A |

OTHER PUBLICATIONS

International Preliminary Report and Written Opinion issued for related PCT Application PCT/US2014/050969 dated Feb. 16, 2016.

* cited by examiner

SYSTEMS AND METHODS FOR USING TIME OF FLIGHT MEASUREMENTS FOR IMAGING TARGET OBJECTS

CROSS REFERENCE TO RELATED APPLICATIONS

This application is a 35 USC 371 application of PCT International Patent Application No. PCT/US2014/050969, filed Aug. 13, 2014 and titled SYSTEMS AND METHODS FOR USING TIME OF FLIGHT MEASUREMENTS FOR IMAGING TARGET OBJECTS, which claims priority to U.S. Provisional Patent Application No. 61/865,225, filed Aug. 13, 2013 and titled SYSTEMS AND METHODS FOR SPARSE APERTURE TIME OF FLIGHT IMAGING; the disclosures of which are incorporated herein by reference in their entireties.

FEDERALLY SPONSORED RESEARCH OR DEVELOPMENT

The technology disclosed herein was made in part with government support under grant number HSHQDC-12-C-00049 entitled "Metamaterial Transceiver for Compressive Radio Frequency Imaging." The United States government has certain rights in the technology.

TECHNICAL FIELD

The presently disclosed subject matter relates to imaging. Particularly, the presently disclosed subject matter relates to systems and methods for imaging target object by use of time of flight measurements.

BACKGROUND

Millimeter wave imaging systems have been widely used. For example, such systems have been used for security reasons such as detecting concealed weapons and obstruction under low visibility conditions. Many current airport scanners perform holographic reconstruction of a target object, but such systems require rotationally scanning a detection arm, which is time consuming. Alternatives, such as focal plane array (FPA) imaging, allow for both passive and active techniques but requires a large array of detectors for high resolution and quality.

State of the art time of flight imaging can performed with focused/collimated beams (time of flight information is obtained along one cross-range ray) either in the receive or the illumination arms, or both. Other imaging techniques may use diverging beams that rely on a large number of spatial samples (field of view requirement) in a large aperture (cross-range resolution requirement). Radar imaging and synthetic radar imaging (SAR) reconstruction algorithms assume that the object is a volume in three dimensional space. This assumption facilitates image reconstruction with only a few measurements.

Surface imaging techniques, such as inverse scattering techniques, and algorithms with coherent diverging beams make assumptions about the electrical boundary of the object as required by the electromagnetic models and also require exhaustive illumination and detection views. This technique uses a sparse measurement scheme and does not make any assumptions about the electrical boundary of the object, the only assumption is that the object can be approximated by a surface in three dimensional space.

Although significant advancements have been made in imaging systems and techniques, there is a continuing need for improved systems and techniques.

BRIEF SUMMARY

Disclosed herein are systems and methods for using time of flight measurements for imaging target objects. According to an aspect, an imaging system includes multiple bistatic radar sensors configured to transmit electromagnetic waves towards a surface of a target object and configured to measure the electromagnetic waves reflected from the surface of the target object. Further, the imaging system includes a computing device comprising one or more processors and memory configured to determine time of flight estimates based on the measured electromagnetic waves. The computing device is also configured to draw, within an image model for the target object, multiple candidate surface portions of the surface of the target object based on the TOF estimates and predetermined positions of the bistatic radar sensors. Further, the computing device is configured to assign weights to each of the candidate surface portions. The computing device is also configured to determine points in the image model where the candidate surface portions meet with a predetermined probability based on the weights. Further, the computing device is configured to define an estimated surface of the target object in the image model based on the determined points.

BRIEF DESCRIPTION OF THE SEVERAL VIEWS OF THE DRAWINGS

The foregoing aspects and other features of the present subject matter are explained in the following description, taken in connection with the accompanying drawings, wherein.

DETAILED DESCRIPTION

For the purposes of promoting an understanding of the principles of the present disclosure, reference will now be made to various embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles “a” and “an” are used herein to refer to one or to more than one (i.e. at least one) of the grammatical object of the article. By way of example, “an element” means at least one element and can include more than one element.

Unless otherwise defined, all technical terms used herein have the same meaning as commonly understood by one of ordinary skill in the art to which this disclosure belongs.

Figure 1:
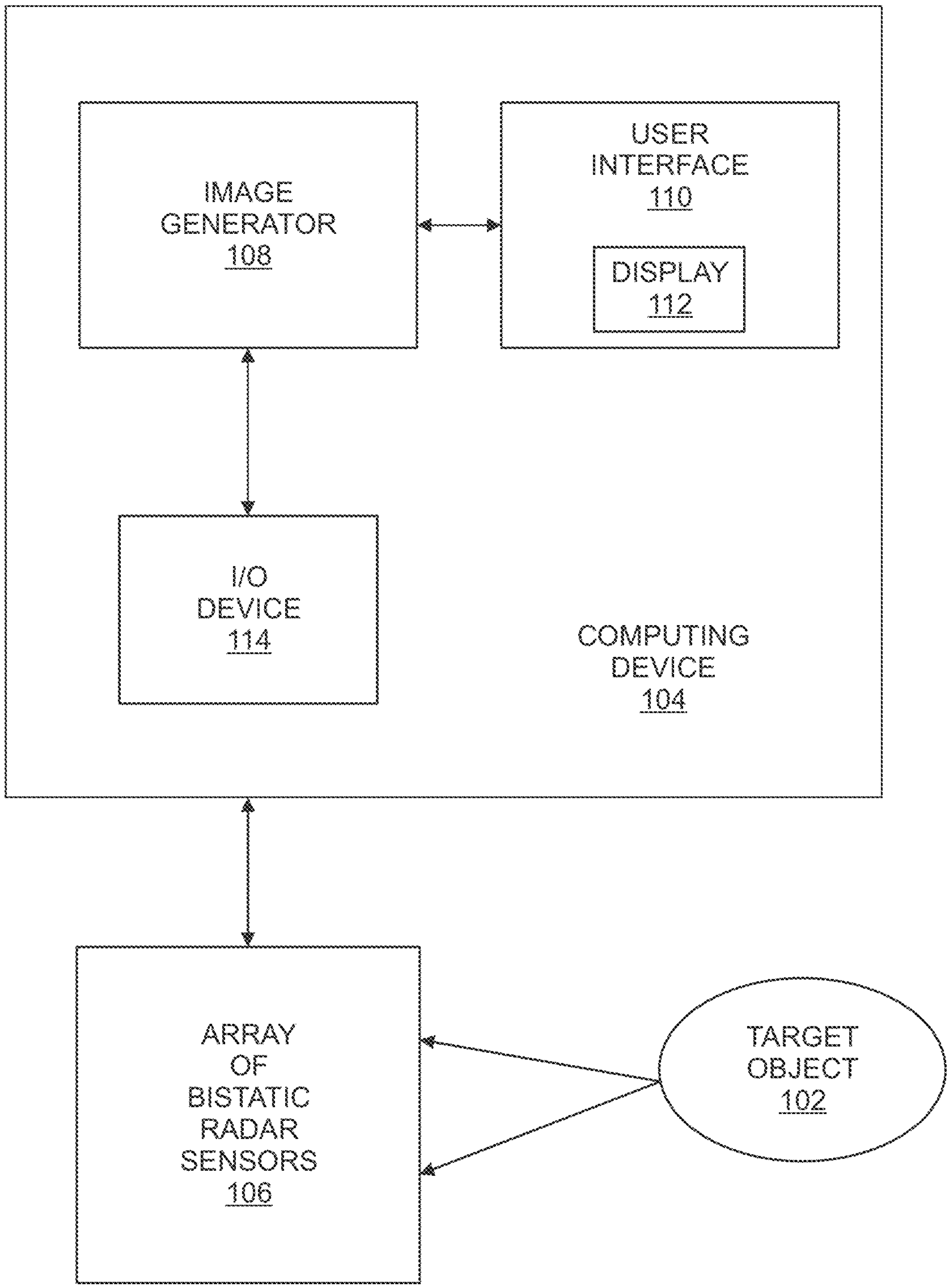
FIG. 1 is a block diagram of an example imaging system for imaging a target object based on time of flight (TOF) measurements in accordance with embodiments of the present disclosure.

FIG. 1 illustrates a block diagram of an example imaging system 100 for imaging a target object 102 based on time of flight (TOF) measurements in accordance with embodiments of the present disclosure. Referring to FIG. 1, the system 100 includes a computing device 104 and an array of bistatic radar sensors 106. The computing device 104 may include an image generator 108 for implementing functionality described herein to define a surface of a target object. The memory may store instructions for implementation by the processor(s). In another example, the computing device 104 may include hardware, software, firmware, or combinations thereof for implementing the image generator 108. As another example, the computing device 104 may be a desktop computer, a laptop computer, a tablet computer, or the like having one or more processors and memory for implementing the image generator 108.

The image generator 108 may define a surface of the target object in either two-dimensions (2D) or three-dimensions (3D). For example, the image generator 108 may generate an image model in 2D space or 3D space and define the target object surface by use of coordinates in the image model. In 2D space, the target object surface may be represented as a contour or line defined by multiple points within the image model. In 3D space, the target object surface may be represented by an area defined by multiple points within the image model.

The computing device 104 may include a user interface 110 for interacting with a user and for presenting images of the target object 102 to the user. The user interface 110 may include a keyboard, a mouse, a trackpad, or the like. In addition, the user interface 110 includes a display 112. The user may suitably interact with the user interface 110 for initiating and controlling imaging of target objects in accordance with embodiments of the present disclosure.

The computing device 104 may include an input/output (I/O) device 114 operatively connected to the array of bistatic radar sensors 106. The image generator 108 may be configured to control the individual activation of the bistatic radar sensors 106 via the I/O device 114. Further, the I/O device 114 may receive output signals from the bistatic radar sensors 106 and may communicate to the image generator 108 data representative of the output signals.

The bistatic radar sensors 106 may be capable of bistatic measurements (e.g., monostatic and quasi-monostatic measurements). Further, the bistatic radar sensors 106 can be placed around the target object 102 in known or predetermined locations. The orientation of and distance between the bistatic radar sensors 106 may be stored in a memory of the computing device 104. The placement of the sensors can be with regular spacing, with Golomb ruler spacing, with random spacing, on a plane facing the target object, around the target object, or the like. The sensors can be configured to operate in a Frequency Modulated Continuous (FMCW) mode where an RF signal is swept across a bandwidth B.

Figure 2:
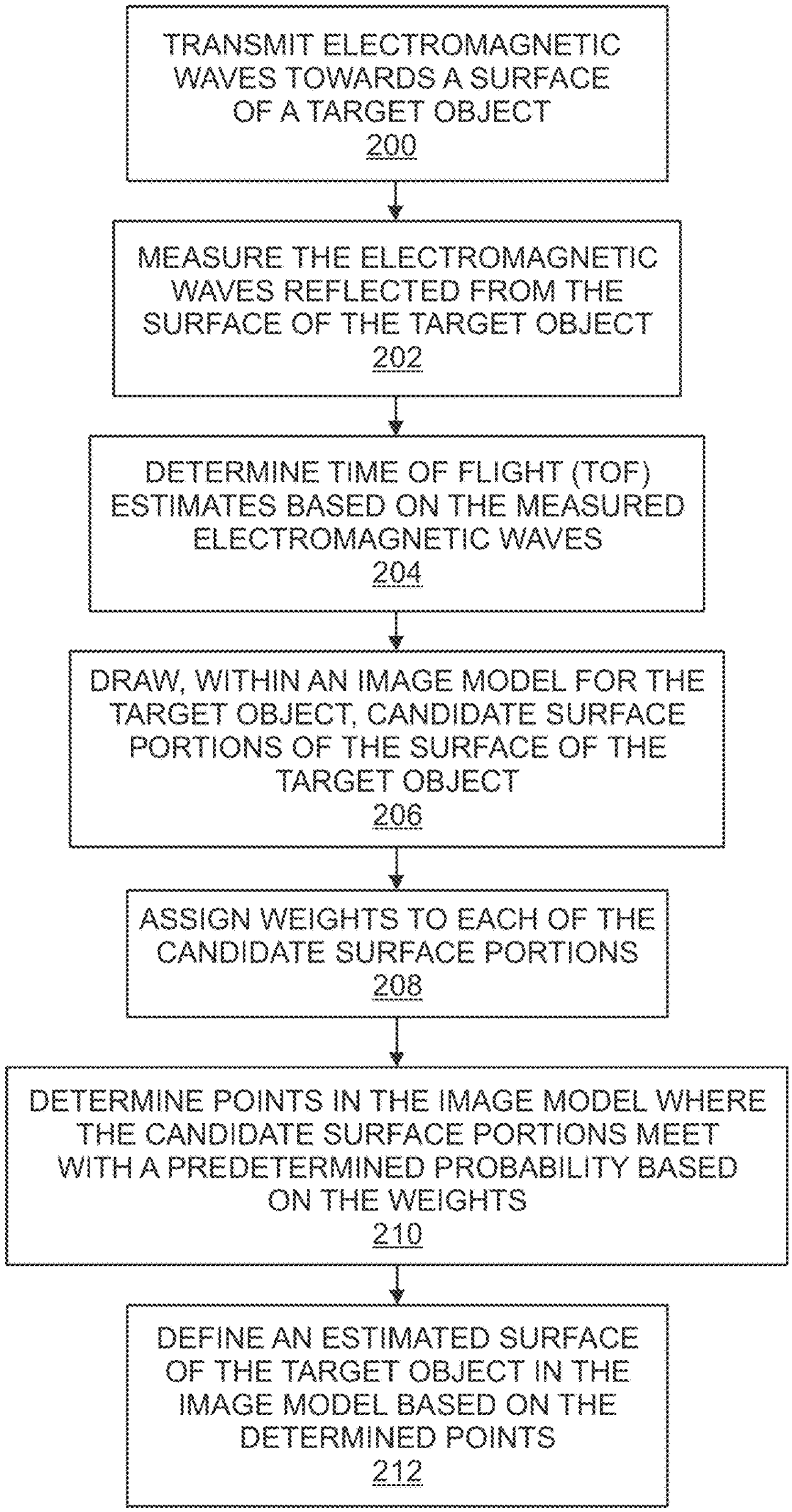
FIG. 2 is a flow chart of an example method for imaging a target object in accordance with embodiments of the present disclosure.

FIG. 2 illustrates a flow chart of an example method for imaging a target object in accordance with embodiments of the present disclosure. The method is described in this example as being implemented by the system 100 shown in FIG. 1, although it should be understood that the method may be implemented by any other suitable system.

Referring to FIG. 2, the method includes transmitting 200 electromagnetic waves towards a surface of a target object. Referring to FIG. 1 for example, the image generator 108 can control the bistatic radar sensors 106 to transmit electromagnetic waves towards a surface of the target object 102. In an example, the bistatic radar sensors 106 can be controlled to operate in a Frequency Modulated Continuous Wave (FMCW) mode to sweep the electromagnetic wave across a predetermined bandwidth. The bistatic radar sensors may include multiple transmitter and receiver pairs for transmission and receipt, respectively, of electromagnetic waves.

The method of FIG. 2 also includes measuring 202 the electromagnetic wave reflected from the surface of the target object. Continuing the aforementioned example, receiver bistatic radar sensors may receive reflected electromagnetic waves that originated from their respective transmitter bistatic radar sensors. As an example, measurements from the pairs (monostatic and bistatic) may be generated as one of the transmitters illuminates an object or scene of interest, and the receivers may coherently measure the reflection from the object or scene. The receiver bistatic radar sensors may subsequently output signals representative of the reflected electromagnetic waves and communicate the signals to the I/O device 114. The I/O device 114 may subsequently communicate data representative of the received signals to the image generator 108 for storage in memory.

Continuing with FIG. 2, the method includes determining 204 TOF estimates based on the measured electromagnetic waves. Continuing the example of FIG. 1, the image generator 108 may determine the TOF estimates based on the measured electromagnetic waves. The TOF estimates may be extracted from FMCW measurements and may be used to reconstruct the target object's support and reflectivity as described in further detail herein.

The method of FIG. 2 includes drawing 206, within an image model for the target object, multiple candidate surface portions of the surface of the target object based on the TOF estimates and predetermined positions of the bistatic radar sensors. Continuing the aforementioned example, the image generator 108 may draw multiple candidate ellipses in an image model based on the TOF estimates and the known positions of the bistatic radar sensors. For example, the TOF estimates and the positions stored in the memory may be used for drawings candidate ellipses as described in further detail herein. The TOF estimates and the positions of the bistatic pairs can be used to draw ellipses in a 2D image model, or ellipsoids in 3D image model, tangent to the target object's surface.

Figure 3:
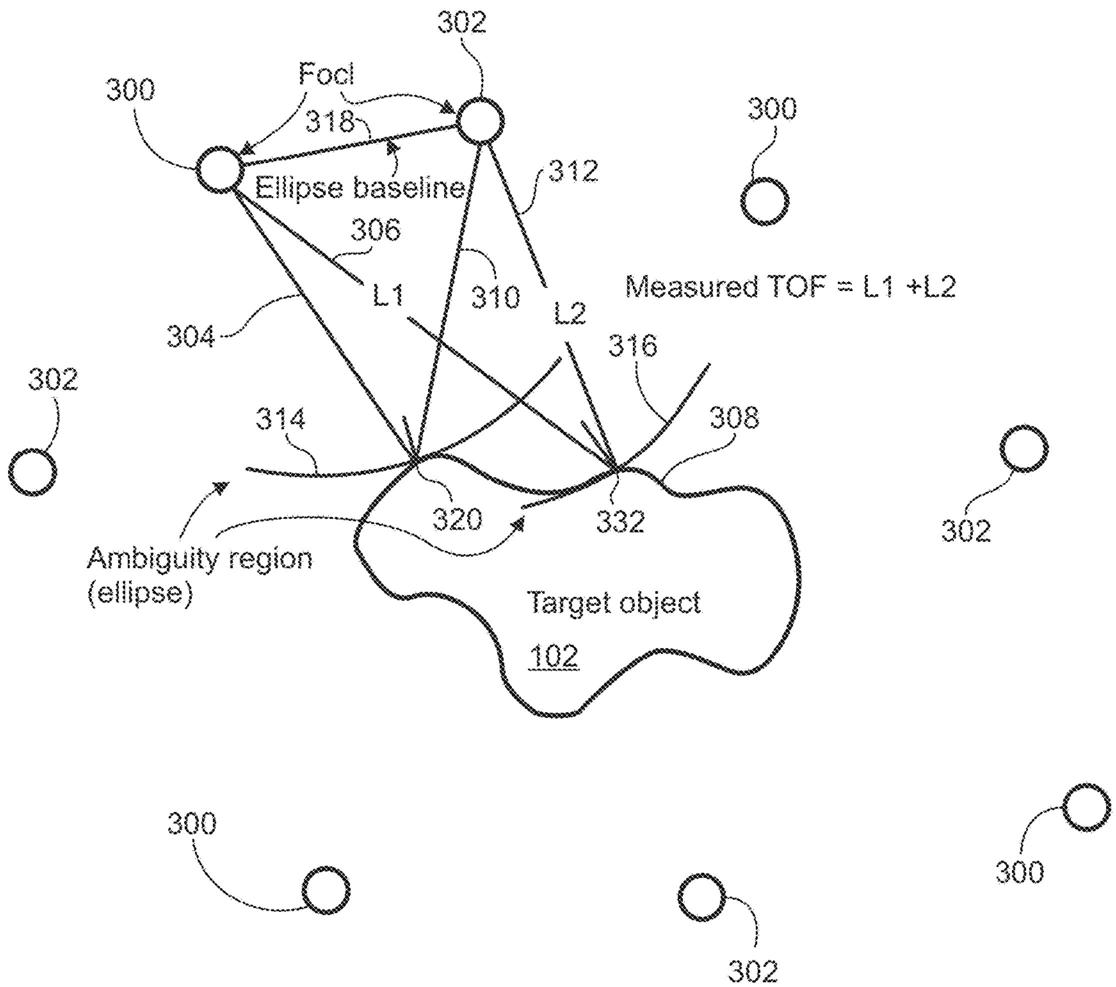
FIG. 3 is a 2D image model showing surface imaging geometry for a target object and bistatic radar sensors.

As an example of drawing candidate surface portions, FIG. 3 illustrates a 2D image model showing surface imaging geometry for a target object and bistatic radar sensors. Referring to FIG. 3, multiple transmitter bistatic radar sensors 300 and receiver bistatic radar sensors 302 are positioned around the target object 102. Turning attention to one of the transmitter-receiver pairs, one transmitter bistatic radar sensor 300 is depicted as emitting to lines 304 and 306 of electromagnetic waves towards two different points on a surface 308 of the target object 102. The electromagnetic wave lines 304 and 306 are reflected by the surface 308 and directed as reflected electromagnetic wave lines 310 and 312, respectively. The image generator 108 may draw the ellipses 314 and 316 based on the known positions of these sensors 300 and 302. As shown, the ellipses 314 and 316 may share a baseline 318 extending between the sensors 300 and 302. Further, as shown, the ellipses 314 and 316 contact different points 320 and 322, respectively, of the surface 308.

It is noted that many of the examples described herein refer to a 2D geometry and a 2D image model, although it should be understood that the systems and methods described herein may also be suitably applied to a 3D geometry and 3D image model. The term "surface" used herein may be used for 2D and 3D geometries and 2D and 3D image models.

Returning to FIG. 2, the method includes assigning 208 weights to each of the candidate surface portions. Continuing the aforementioned example, the image generator 108 may assign weights to the ellipses 314 and 316 shown in FIG. 3. Further, the method of FIG. 2 includes determining 210 points in the image model where the candidate surface portions meet with a predetermined probability based on the weights. The method also includes defining 212 an estimated surface of the target object in the image model based on the determined points. Details of these steps are provided in further detail herein.

As referred to herein, ellipses are referred to as candidate surface portions, because the reflective electromagnetic wave may have come from any point on the ellipse. A weighting algorithm may be used to isolate the parts of the ellipses that are close to the surface. The points where the ellipses and the surface meet with high probability are initially estimated based on the ellipse weights. A surface that may be considered the initial estimated surface can be fitted (with some smoothness criteria) to the estimated points. For improved results, a second iteration of surface estimation can be performed with the first estimate as a constraint. The estimated surface and the signal returns from each measurement can be used to estimate the reflectivity of the target surface.

Figure 4:
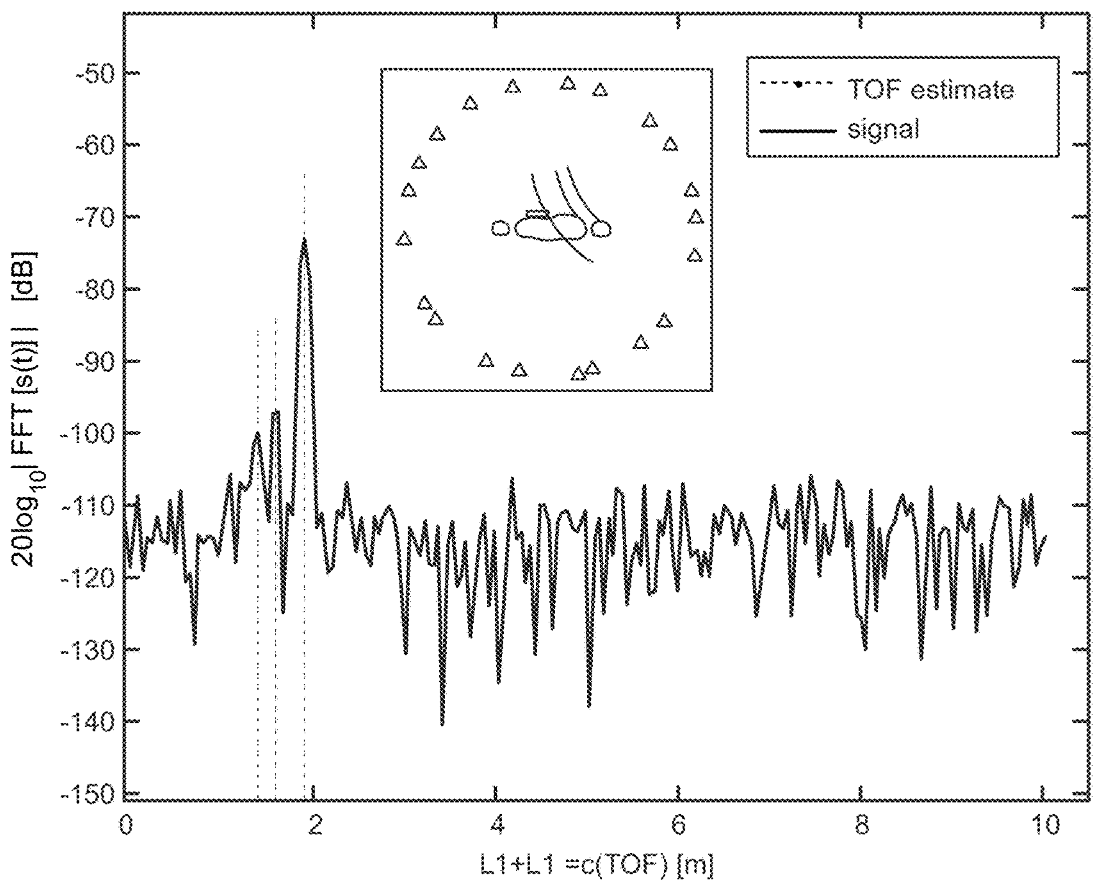
FIG. 4 is a graph showing an example of the estimate using the OMP estimation technique.

In accordance with embodiments of the present disclosure, a method of surface estimation and reflectivity estimation can include multiple steps as described herein. An initial or first step may involve TOF estimation. In this step, TOF returns from each measurement may be estimated. The complex valued signal measured by the receiver of a given pair can be approximated by use of the following equation:

$$s(t)=\sum_{n=1}^{N} A_0\exp\left(i2\pi\tau_n\frac{Bt}{T}+i\phi_c\right)[u(t)-u(t-T)]+s_n(t) \tag{1}$$

where u(t)=1 for t≥0 and 0 otherwise, $s_n(t)$ is measurement noise, B is the RF bandwidth, T is the sweep time, $\phi_c$ is a time invariant phase term and $\tau_n$ is the TOF from the $n^{th}$ return surface point on the scene. The TOF is equal to $(L_{1n}+L_{2n})/c$ (see FIG. 3 for example), the path length from the source to the surface point to the receiver divided by the speed of light. For objects that are specular, the number of TOF returns, N, can be expected to be small. Specular objects are mirror like, therefore, TOF returns may only be produced by the parts of the surface for which a tangent ellipse with foci at the transmitter and receiver can exist. The TOF values in the signal can be estimated by using well known sparse estimation techniques such as Basis Pursuit DeNoising (BPDN) or Orthogonal Matching Pursuit (OMP). Both of these techniques use the generation of an over complete dictionary which can be generated using the model in Equation 1. As can be appreciated by those of skill in the art, the parameters of the estimation may depend on the measured signal level and the noise level. FIG. 4 illustrates a graph showing an example of the estimate using the OMP estimation technique. More particularly, FIG. 4 illustrates a graph of an example of the Fourier transform of the measurement signal (simulation corrupted with complex white Gaussian noise, SNR=20 dB, B=6 GHz) and the estimated TOF using the OMP estimation. The inset of FIG. 4 shows the simulated geometry with the arrow indicating the monostatic pair and blue lines showing the estimated TOF ellipses. The data in FIG. 4 was simulated using a Method of Moments (MOM) electromagnetic simulation of the target and antennas. The sweep included 201 points across 6 GHz bandwidth starting at 57 GHz. The data was corrupted with complex white Gaussian noise prior to TOF estimation. Three TOF returns where present in the data. The OMP dictionary included 3015 entries.

Because of the presence of noise in the signal and because of possible interference from close TOF returns due to limited sweep bandwidth, the estimation has limited accuracy. To minimize the clutter of ambiguity (ellipse) regions, the number of estimated TOFs was limited to a low preset number. As an example, a preset number between 2 and 10 can provide a good tradeoff between the clutter and the desired resolution on the target.

Once the TOFs are estimated for each pair, corresponding ellipses can be calculated and drawn. The ellipses are evaluated using the geometry relationships for the ellipse. The estimated TOF range equivalent ($L_1+L_2=c(TOF)$) is equal to the major axis of the ellipse. The foci separation may be obtained from the known position of the transmitter and receiver. The geometric ellipse relationships may be applied to determine the rest of the ellipse parameters may form these.

Figure 5:
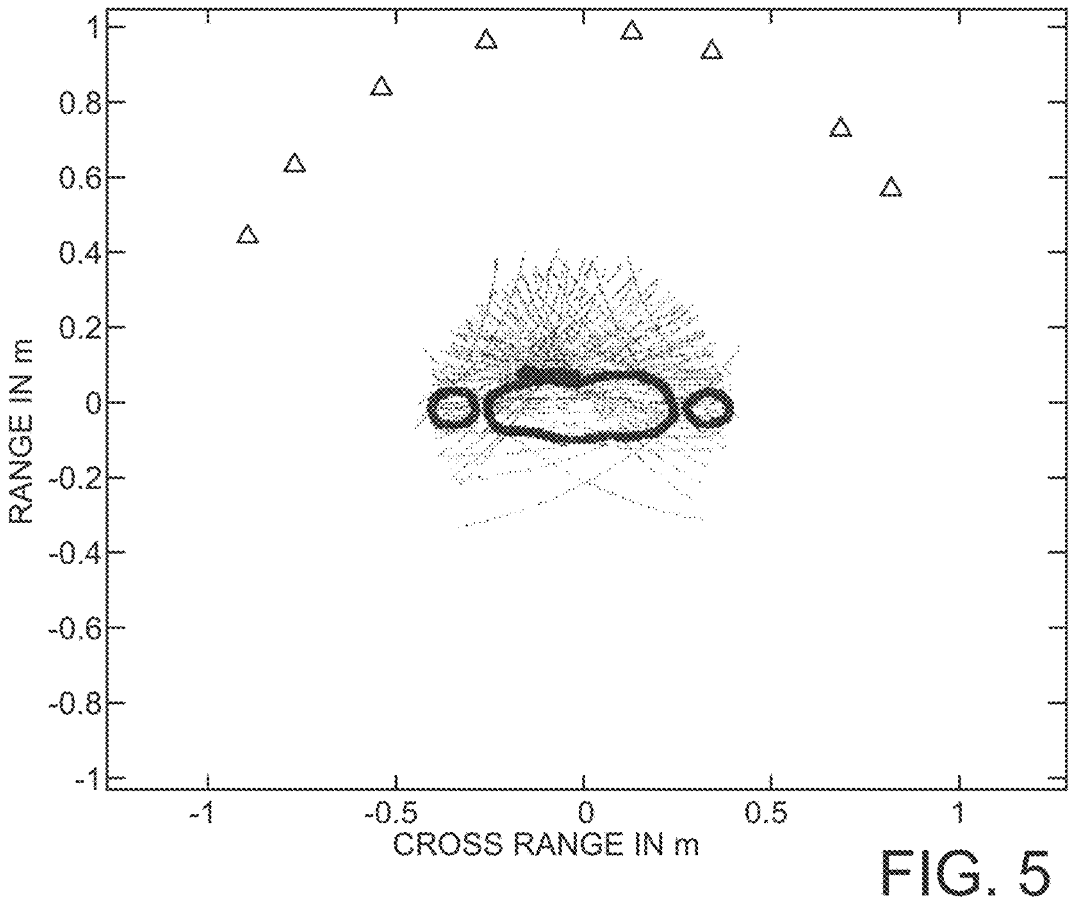
FIG. 5 is a graph of TOF ellipses for 8 transceiver sensors.

To reduce clutter, the part of the ellipse may be drawn to most likely cover the entire target object. This may be accomplished by using the parametric equations of the ellipse (where the parameter is the angle with respect to the major axis) and drawing the part of the ellipse corresponding to the value of the parameter that extends a specified angle and centered on the line that connects the center of the foci with the center of the scene. The resulting ellipses for 8 transceiver sensors are shown in FIG. 5, which illustrates a graph of TOF ellipses for 8 transceiver sensors. The angle of extent in this simulation was set to $\pi/4$.

Figure 6:
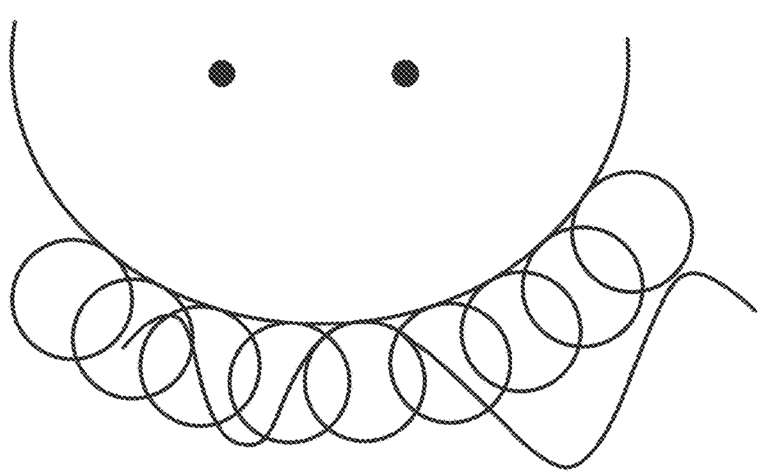
FIG. 6 is a diagram of an example circle test for weighing the ellipse.
Figure 7:
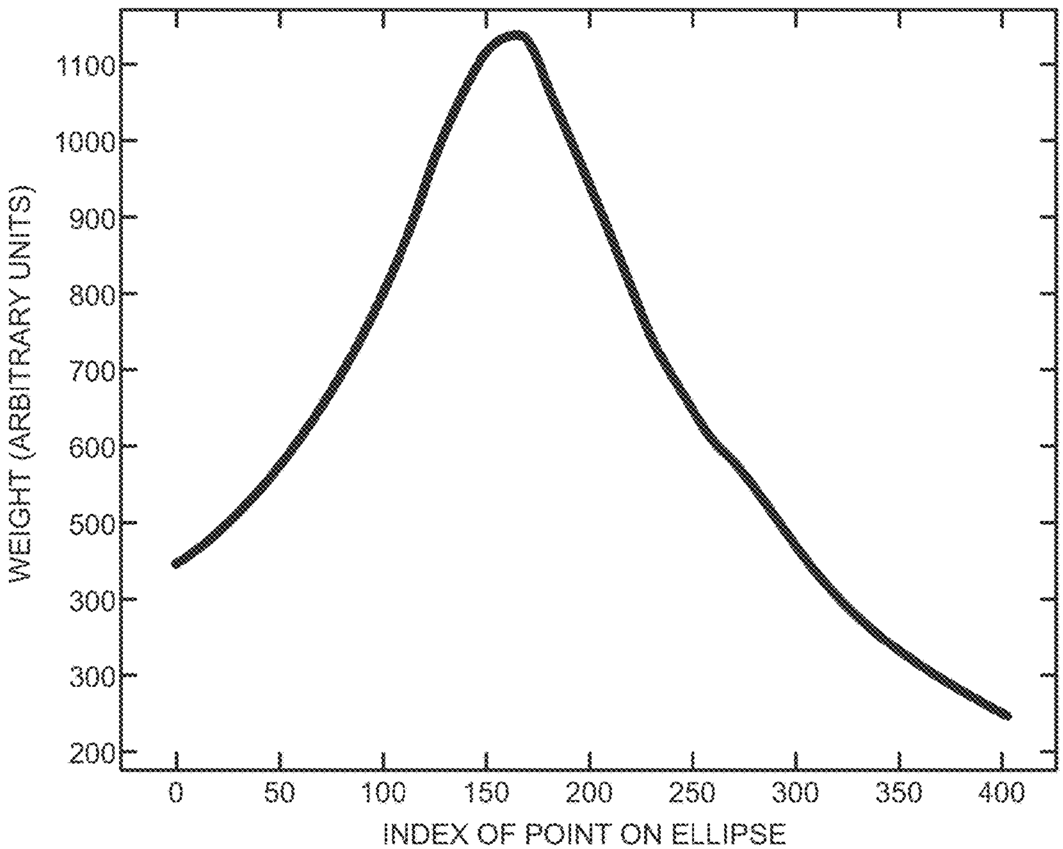
FIG. 7 is a graph of the result of the ellipse weight calculation for 401 points on the ellipse.

In order to estimate the surface from the TOF estimates, the part of the ellipses or ambiguity regions that is most likely on the target may be identified. This achieved by testing each part of the ellipse with a circle (sphere in the three dimensional case). This concept is depicted in FIG. 6, which illustrates a diagram of an example circle test for weighing the ellipse. To calculate the weight for a given point on the ellipse, a test circle of a specified radius and tangent to the ellipse at that point was placed at that point. The TOFs from all the pairs to the circle were calculated analytically and compared against the estimated TOFs for those pairs. The weight was then be assigned based on the distance between the calculated (circle) and estimated (target) TOFs. The closer the distance, the higher the weight. For the purpose of calculating the weights, if more than one TOF is estimated for a given pair, new pairs are created corresponding to each additional TOF. These fictitious pairs are located in the same location as the original pairs. The existing pairs and the new pairs are now called TOF pairs (as many pairs as TOFs, with some pairs coinciding in location). The formula used for the weight calculation of the $i^{th}$ point on the $j^{th}$ ellipse is given in equation 2 as follows:

$$W_{ij} = \sum_{p=1}^{Number\ of\ TOF\ pairs} \frac{1}{(|cTOF_{ijp} - TOP_p| + \alpha)\gamma} \tag{2}$$

where cTOF indicates the circle calculated TOF, p is the index enumerating the TOF pairs, $\alpha$ is a regularization parameter, and $\gamma$ is a parameter controlling the sharpness of the weight calculation. FIG. 7 illustrates a graph showing an example of the result of the weights calculation for one of the ellipses in FIG. 5. More particularly, FIG. 7 depicts a graph of the result of the ellipse weight calculation for 401 points on the ellipse. The radius of the test circle was 5 cm, the value of the regularization parameter was 0.3 and the sharpness parameter was 2. The weight function indicates that points of the ellipse with index between 150 and 170 are most likely to be close to the surface.

Figure 8:
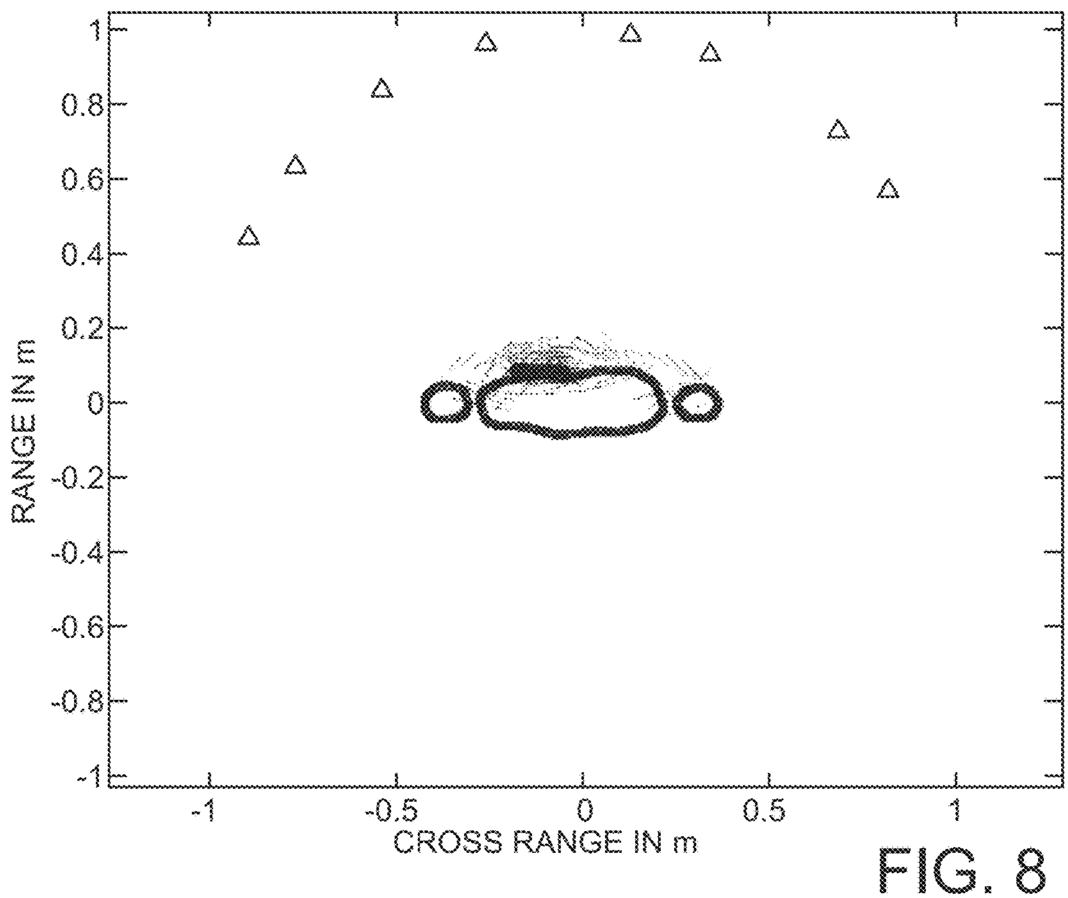
FIG. 8 is a graph showing the result of the truncation with the extent from maximum criteria, and the extent set to 20% of the ellipse centered on the index of the maximum weight.

The weights for each ellipse are used to further reduce the ellipse/ambiguity clutter. To achieve this, thresholding may be used. Two possible thresholding criteria are percent of maximum and extent from maximum. The percent of maximum criteria keeps all the points with weight values above a given percentage of the maximum value. The extent from maximum criteria keeps all the points that are located within a given index proximity to the index of the maximum weight value. FIG. 8 illustrates a graph showing the result of the truncation with the extent from maximum criteria, and the extent set to 20% of the ellipse centered on the index of the maximum weight.

Figure 9:
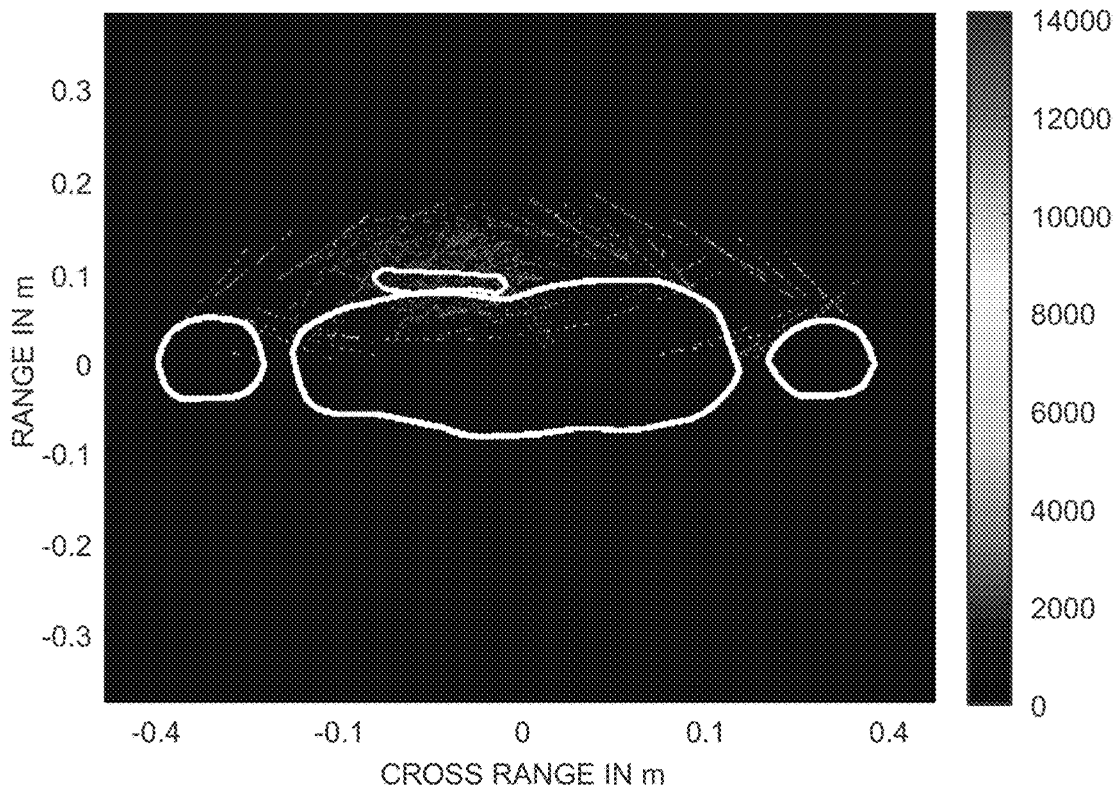
FIG. 9 is an image showing the original object and the remaining ellipses color coded by their weights.
Figure 10:
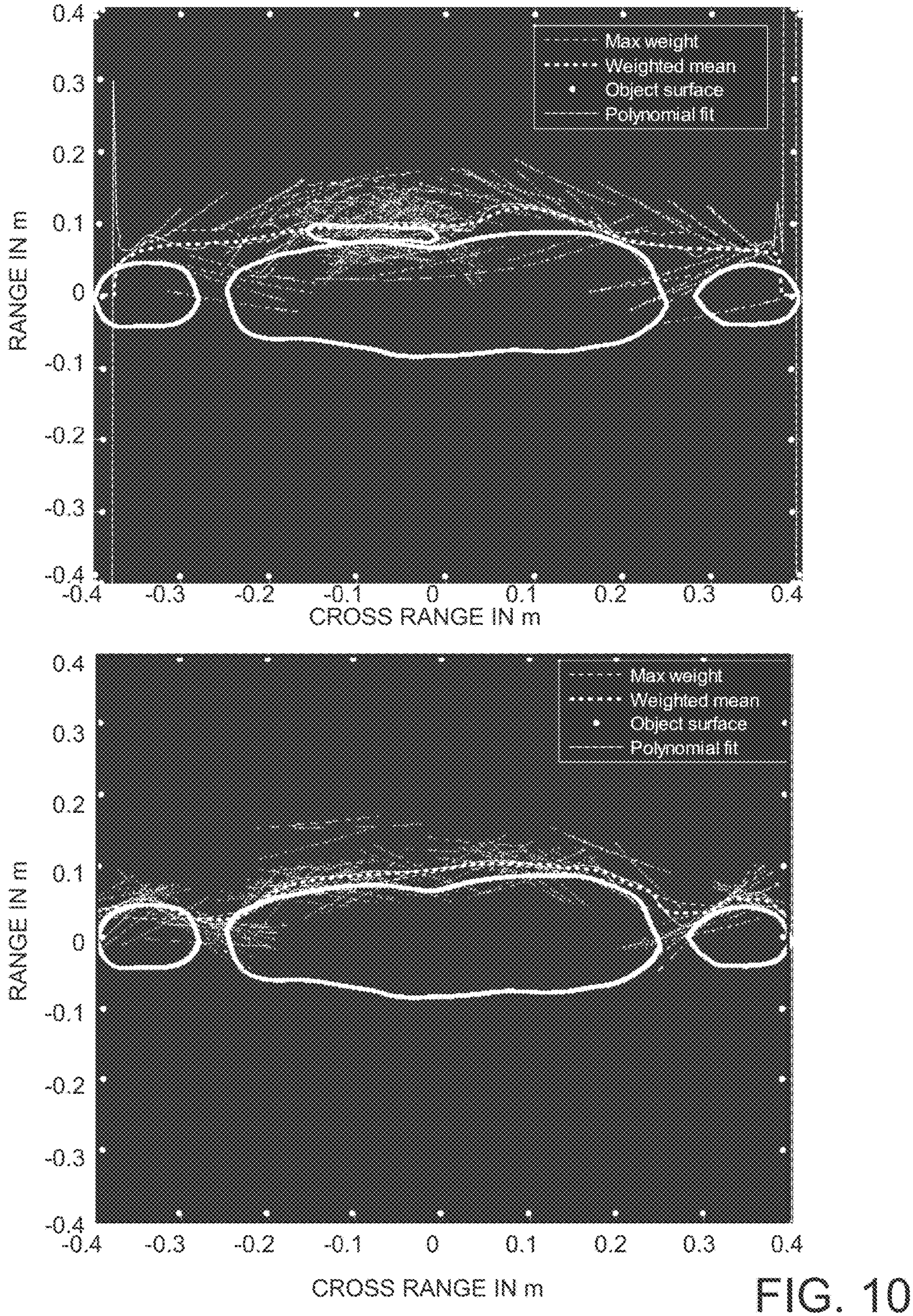
FIG. 10 is images depicting results of the surface estimate for two different objects.

With most of the ambiguity clutter removed, the surface of the object may be estimated. In one embodiment, the weights of the remaining parts of the ellipses may be used to estimate the surface by means of a weighted mean, or maximum criteria. In another embodiment, a polynomial or a specified to all the remaining ellipse points may be fit. FIG. 9 illustrates an image showing the original object and the remaining ellipses color coded by their weights. The ellipse points have been placed on a regular grid to facilitate processing. To estimate the surface with the weighted mean criteria, the points can be analyzed along vertical lines (or along all ranges). The weighted mean, where the weights are the weights of the ellipses, of the ranges along that cross range line becomes the estimated surface range. For the maximum weight criteria, the point with the highest weight along the vertical lines may be found, and that point may become the estimated surface range. For the polynomial fit estimation, a polynomial may be fitted to all points regardless of the weight. A weighted polynomial fit may also be utilized. FIGS. 8 shows the results of these fits for two different objects. More particularly, FIG. 10 illustrates images depicting results of the surface estimate for two different objects. The object on the top in FIG. 10 is composed of low reflectance parts and a high reflectance part (small loop on top of the large loop). The object on the bottom is composed of low reflectance parts. Additional surface estimation can iterations can be performed using the first estimate as a constraint. These additional estimations can provide better estimations of the surface.

The reflectivity of the surface can be estimated by using the estimated surface and the measurements. In this steps, the value of the signal return can be assigned to the points on the estimated surface where it is most probable that it came from. As a first step, a matrix of weights can be built that are indexed by an estimated TOF and a point on the estimated surface. The weight can be calculated according to Equation 3.

$$w_{ij} = \frac{1}{(|TOF_i - (L_{1ij} + L_{2ij})| + \alpha(\theta_i - \theta_j) + \beta)^{\gamma}} \tag{3}$$

where:

i indexes the TOF and the corresponding bistatic pair, j indexes the point on the estimated surface, $L_1$ is the distance from the transmitter to the point, $L_2$ is the distance from the receiver to the point, $\theta_i$ and $\theta_j$ are the angle of the tangent of the TOF ellipse at the point on the ellipse closest to the point on the surface and the angle of the tangent at the point on the surface, respectively, $\alpha$ is a regularization parameter weighing the tangent angle difference, β is a regularization parameter constraining singularity, and γ is a parameter controlling the sharpness of the weight calculation.

As a second step, the value of the signal at each TOF may be found. This may be accomplished by Fourier transforming the measured frequency domain signal to obtain a time domain or range signal and estimating the value of the return at the estimated TOF, i.e., the value of the signal peaks in FIG. 4. The signal values (peaks) may be stored in an array indexed by the TOFs. The relative reflectivity can now be estimated using equation 4 as follows:

$$R_j=\Sigma_{i=1}^{Number\ of\ TOF\ pairs} w_{ij} P_i \quad (4)$$

The absolute reflectivity can be obtained from the result of equation 4 by means of calibration with a known reflectivity target.

Figure 11A:
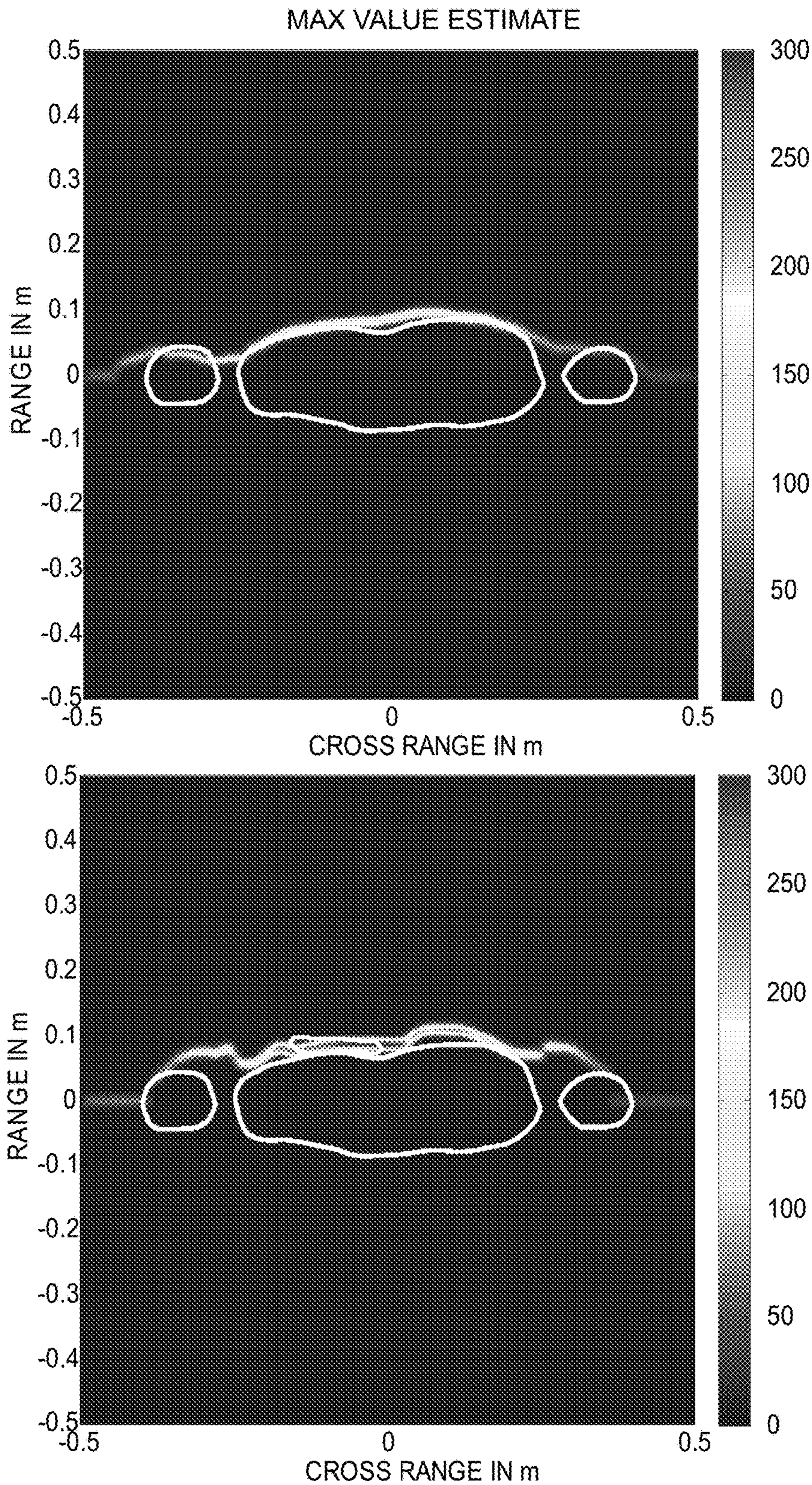
FIGS. 11A-11C are images showing the results of the surface and reflectivity estimation for two different targets and for the three surface estimation criteria introduced previously.
Figure 11B:
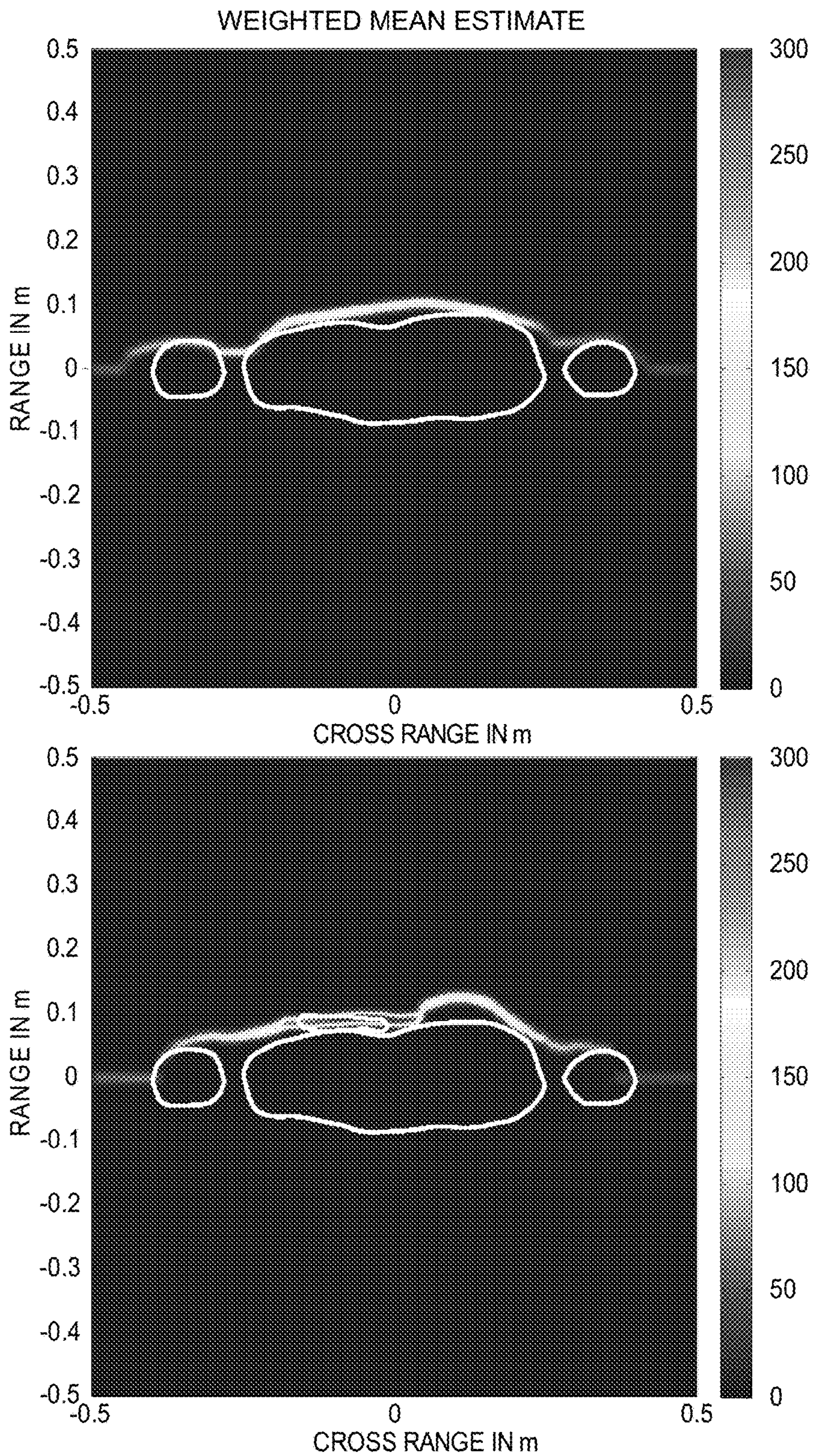
Figure 11C:
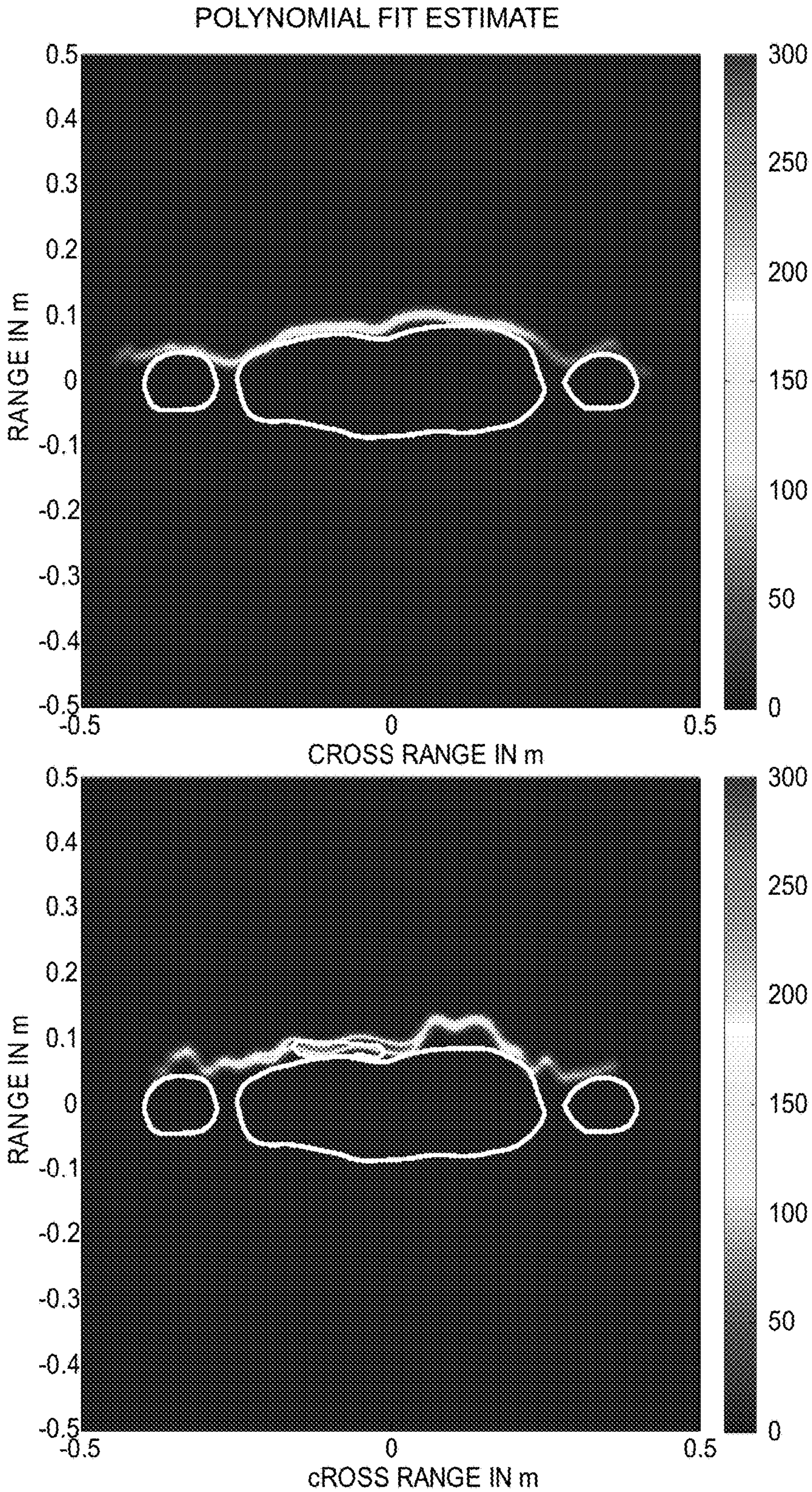

FIGS. 11A-11C are images showing the results of the surface and reflectivity estimation for two different targets and for the three surface estimation criteria introduced previously. The relative reflectivity estimate may be color-coded and superimposed on the surface estimate. In this example, the estimate is gray scaled. The object in the images at the top of FIGS. 11A-11C is composed of low reflectance parts whereas, the object in the images at the bottom of FIGS. 11A-11C is composed of low reflectance parts and a high reflectance part (small loop on top of the large loop). The relative reflectivity estimate indicated the presence of a highly reflective part on the object in the images at the bottom of FIGS. 11A-11C.

Figure 12A:
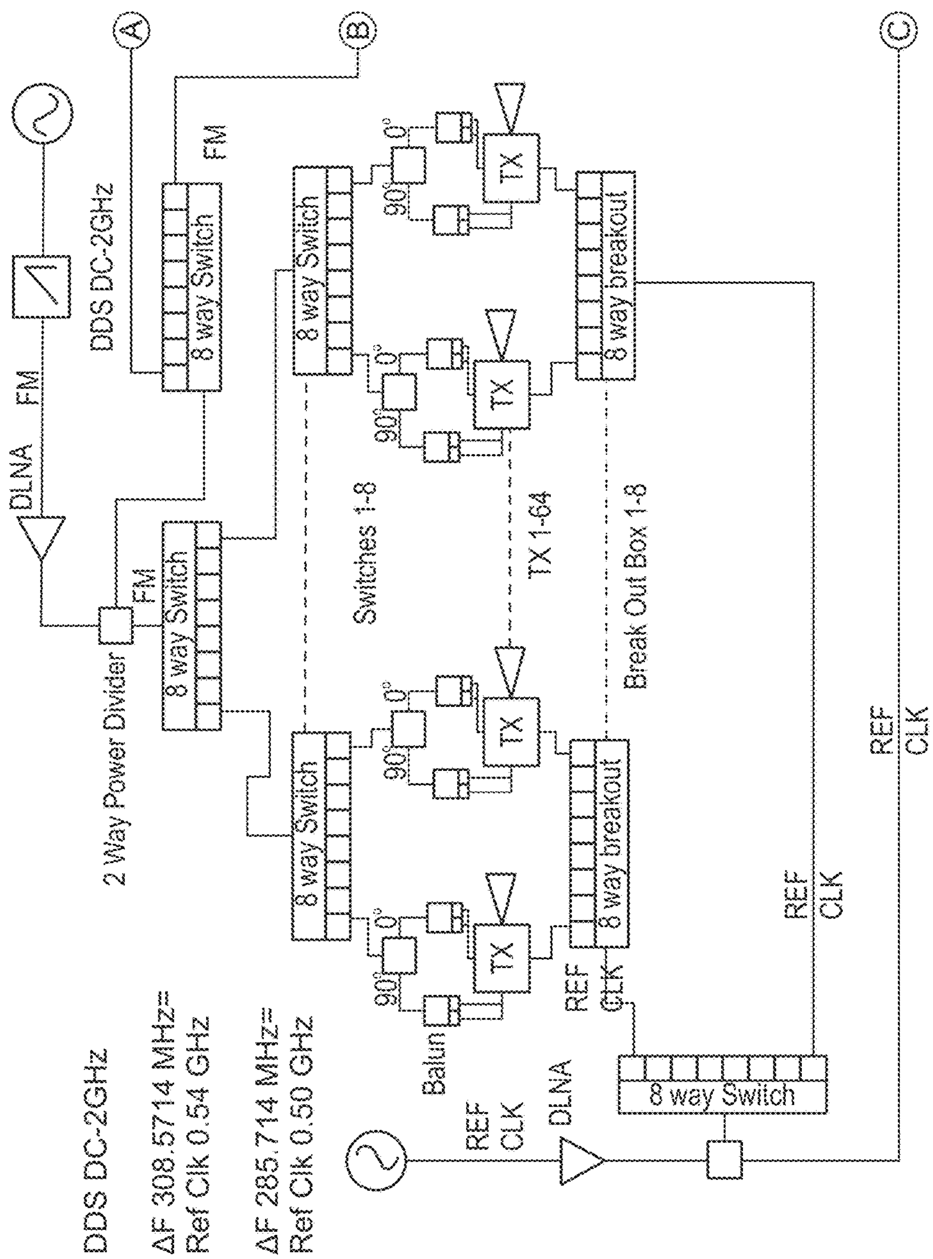
FIGS. 12A and 12B illustrate a block diagram for an example of such a system.
Figure 12B:
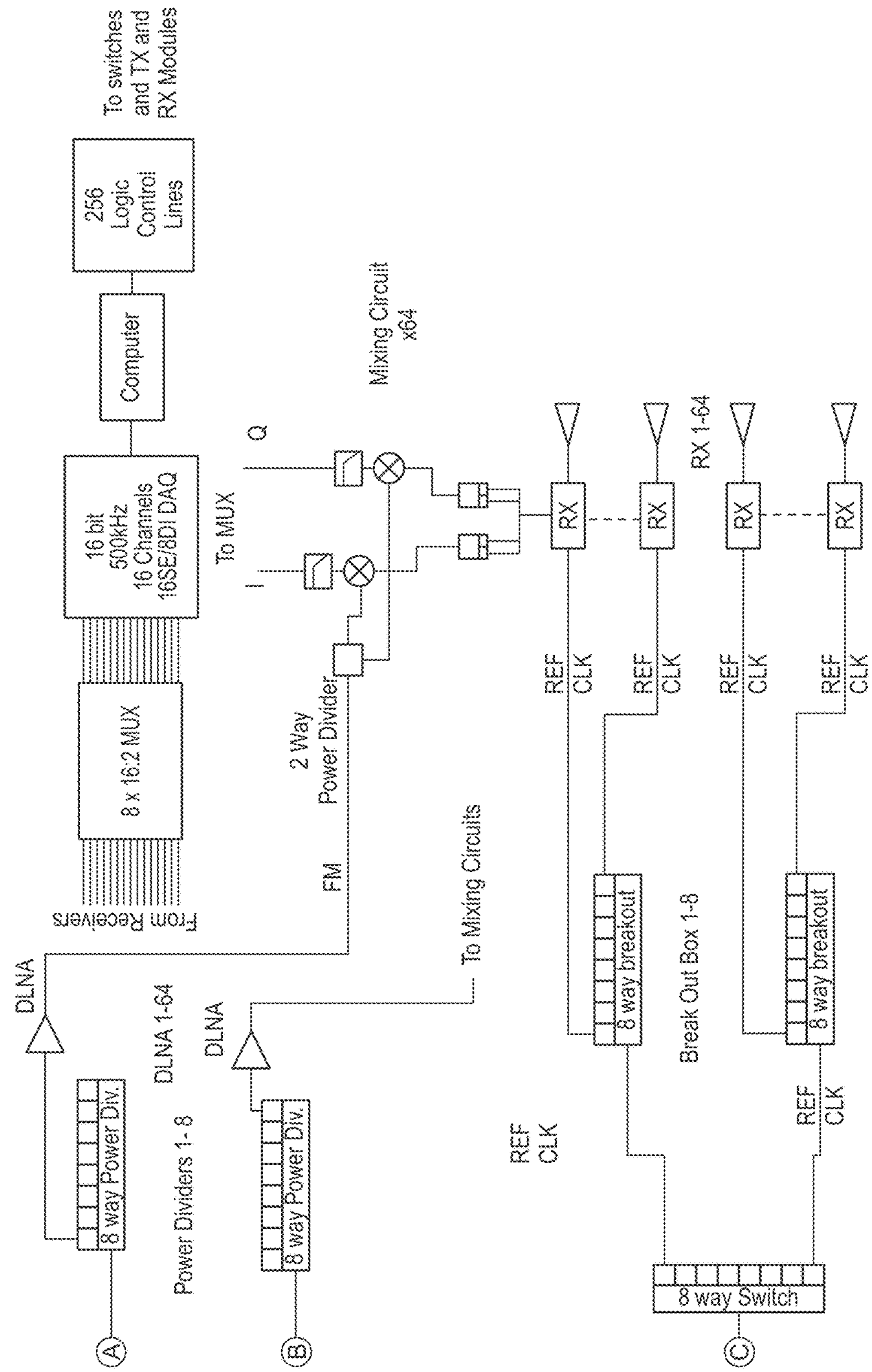

A system of sensors capable of the measurements described herein can be implemented with off the shelf components. FIGS. 12A and 12B illustrate a block diagram for an example of such a system. Referring to FIGS. 12A and 12B, the system is a multi-static Frequency Modulated Continuous Wave (FMCW) system with 64 transmitters and 64 quadrature receivers. The transmitters and receivers use common reference signals for coherent measurements. The quadrature receivers provide the complex frequency domain signal, which can be transformed to obtain time domain range signals similar to those shown in FIG. 4. At each measurement moment one transmitter and eight receivers can be selected using the transmitter and receiver switches. The receiver signals are connected over MUX to the 16 channel data acquisition device (2 channels per quadrature receiver) connected to the processing computer. The transmitter, receiver, and MUX switches are controlled from the computer or any suitable computing device. Table 1 below is an example parts list for the system.

TABLE 1

Example Parts List for the System Shown in FIG. 10

| Item | Part Number | Manufacturer | Supplier | Specification | Number Needed |
|---|---|---|---|---|---|
| V-band Transmitters | HMC6000LP711E | Hittite | Hittite | 57-64 GHz 11 dBm, Internal Antenna | 64 |
| V-band Receivers | HMB6001LP711E | Hittite | Hittite | 57-64 GHz, 38-67 dB Gain, Internal Antenna | 64 |
| 8-way Switch | HMC321LP4 | Hittite | Hittite | DC - 8 SP8T 2.3 40 23 0/+5 V LP4 | 12 |
| DDS Chip | AD9914/PCBZ | Analog Devices | Analog Devices | 3.5 GSPS Direct Digital Synthesizer w/ 12-Bit DAC | 2 |
| Ref. Clock | 129020-HMC838LP6CE | Hittite | Hittite | FRACTIONAL-N PLL WITH INTEGRATED VCO 795-945, 1590-1890, 3180-3780 MHz | 2 |
| Mixers | SYM-2500+ | Minicircuits | Minicircuits | Level 7 (LO Power +7 dBm) 1 to 2500 MHz | 128 |
| LPF | LPF-BOR3+ | Minicircuits | Minicircuits | 50 ohm DC-.3 MHz | 128 |
| LNA | DVGA2-33+ | Minicircuits | Minicircuits | 50 ohm 0.05 to 3 GHz 31.5 dB, 0.5 dB Step, 6 Bit Ser | 16 |
| 2-way Power Dividers | SYPS-2-252+ | Minicircuits | Minicircuits | 2 Way 0 Deg 5-2500 MHz | 66 |
| Quadrature Coupler | RFHB05M03GVT | RF Lambda | RF Lambda | 2 Way 0/90 Degree 500 MHz-2000 MHz | 64 |
| Balun | TC4-14G2+ | Minicircuits | Minicircuits | 200-1400 MHz Balun | 256 |
| 8-way Power Dividers | P8-09-408 | Pulsar Microwave | Pulsar Microwave | 5-2000 MHz 8-way | 8 |
| 16:2 MUX | ADG726 | Analog Devices | Analog Devices | 16:2 +1.8 V to +5.5 V, 2.5 V Analog Multiplexers | 8 |

TABLE 1-continued

| Example Parts List for the System Shown in FIG. 10 | | | | | |
|---|---|---|---|---|---|
| Item | Part Number | Manufacturer | Supplier | Specification | Number Needed |
| Data Acquisition | DT9834-16-0-16-BNC | Data Translation | Data Translation | USB (DAQ); 16-bit, 500 kHz, 16 AI, 32 DIO, 5 C/T, BNC | 1 |
| DIO/Logic Control | NI PCI-6509 | NI | 96 Channels 5 V TTL | NI | 3 |
| Cables | 4846-X-60 | Pomona | Mouser | MM SMA < 12 GHz · 5 dB/ft 60" | 128 |

The system shown in FIGS. 12A and 12B can be operated between 56 GHz and 64 GHz. Other operation frequencies may also be implemented. The imaging method may be independent of the frequency of operation as long as the phenomenology of the spectrum supports the assumptions of the method—namely the objects to be images are non-diffuse and mirror like.

Figure 13:
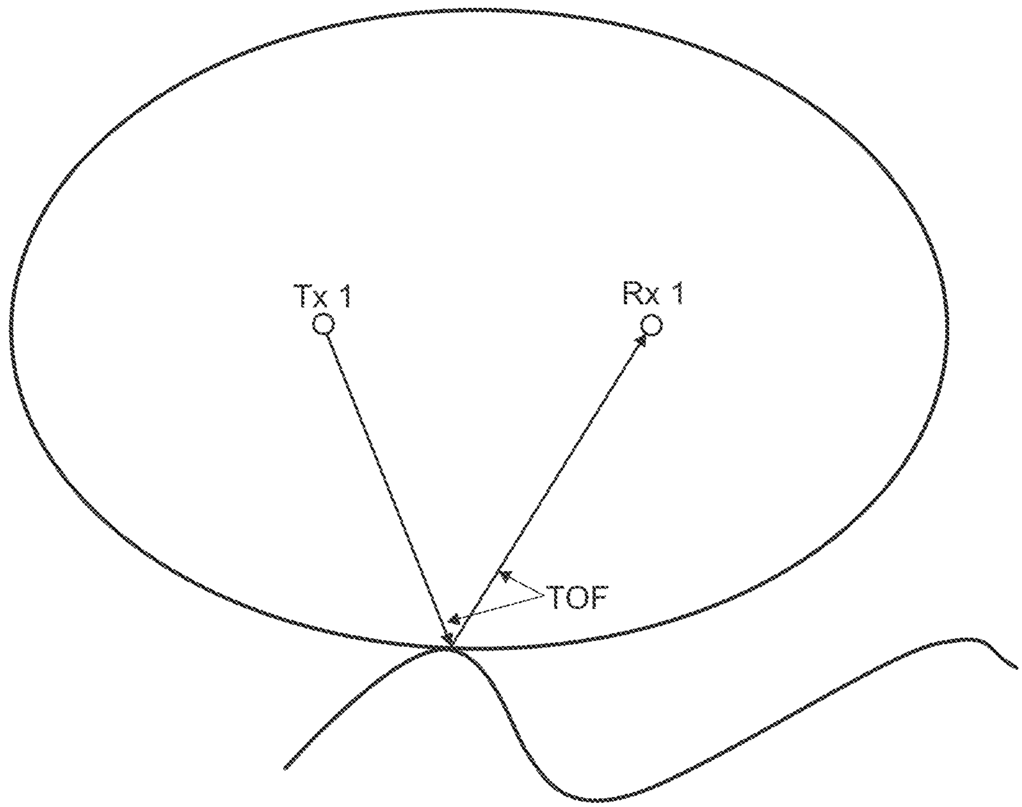
FIG. 13 is a 2D image model showing a bistatic pair, a first surface estimate, and the measured TOF ellipse.
Figure 14:
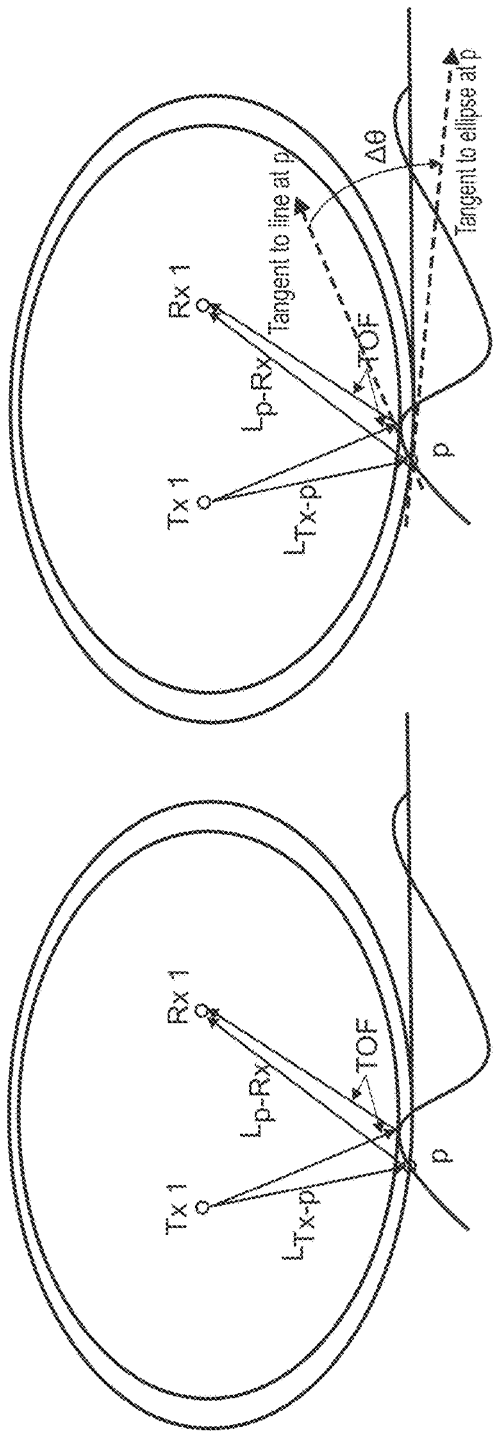
FIG. 14 depicts diagrams showing weight calculation.
Figure 15:
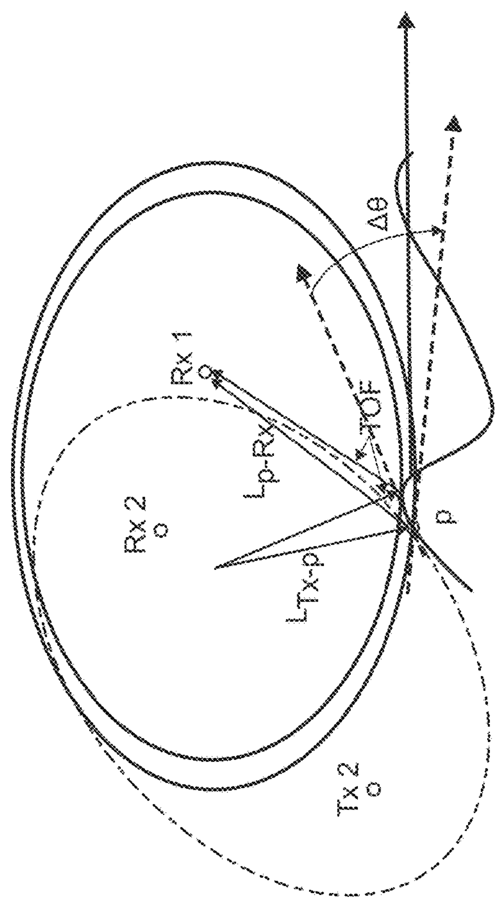
FIG. 15 is a diagram showing another bistatic pair and corresponding TOF that is tested against point p.

In accordance with embodiments of the present disclosure, improved results for defining a target object surface may be obtained by performing additional iterations of surface estimation with the first estimate being used as a constraint. The estimated surface and the signal returns from each measurement may be used to estimate the reflectivity of the target surface. The method of surface estimation that was developed previously is good first estimate of the surface shape. The estimate can be further improved by using the first estimate as a starting point or constraint for the next estimate. As an example, FIG. 13 illustrates a 2D image model showing a bistatic pair, a first surface estimate, and the measured TOF ellipse. The estimation improvement process may begin by testing each point on the current surfaces estimate. For each point that is tested, a distance weight and an angle weight associated with the bistatic pair and the point may be calculated. For example, FIG. 14 depicts diagrams showing weight calculation. Example equations for weight calculation follow:

$$w_{1p} = a_1 \frac{1}{(reg|TOF - (L_{Tx-p} - L_{p-Rx})|)^2} + a_2 \frac{1}{(reg + |\Delta\theta|)^{\gamma}} \quad (5)$$

where reg are regularization values, $a_1$ and $a_2$ set the importance of the distance and angle weights, γ is a weight sharpness factor and the other terms are illustrated in FIG. 14. The weights capture how close the estimated surface point is to each ellipse and how conforming (or tangent) it is. These weights may be calculated for each TOF estimate (each bistatic pair can have more than one TOF estimate) and for each point on the estimated curve. FIG. 15 illustrates a diagram showing another bistatic pair and corresponding TOF that is tested against point p.

Figure 16:
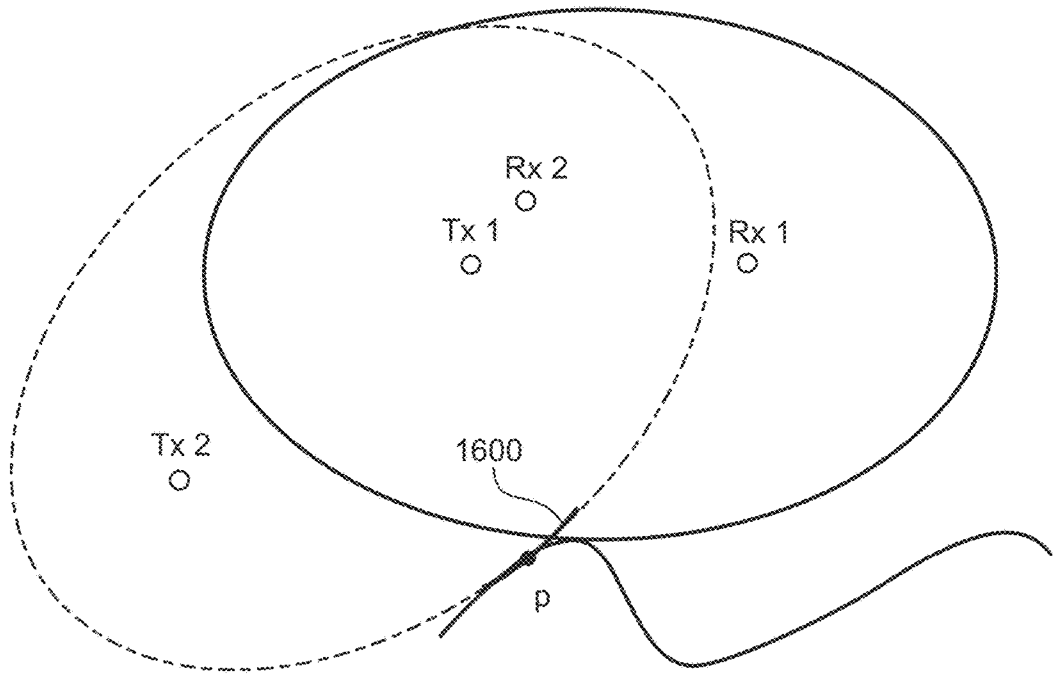
FIG. 16 depicts a diagram with segment being the section.

Because this second TOF ellipse (Tx 2-Rx 2) is closer and more tangent to the estimated curve at point p than the first TOF ellipse (Tx 1-Rx 1), the corresponding weight is larger ($w_{2p} > w_{1p}$). The weight matrix can be used to identify which parts of each ellipse to keep for the next surface estimate. The weights associated with each TOF can be searched for the largest value and hence find the point on the estimated surface that is closest (largest combined distance and angle weight) to the TOF ellipse. Subsequently, the section of the TOF ellipse closest to the point may be used to calculate the next estimate. This step is illustrated in FIG. 16, which depicts a diagram with segment 1600 being the section.

Figure 17:
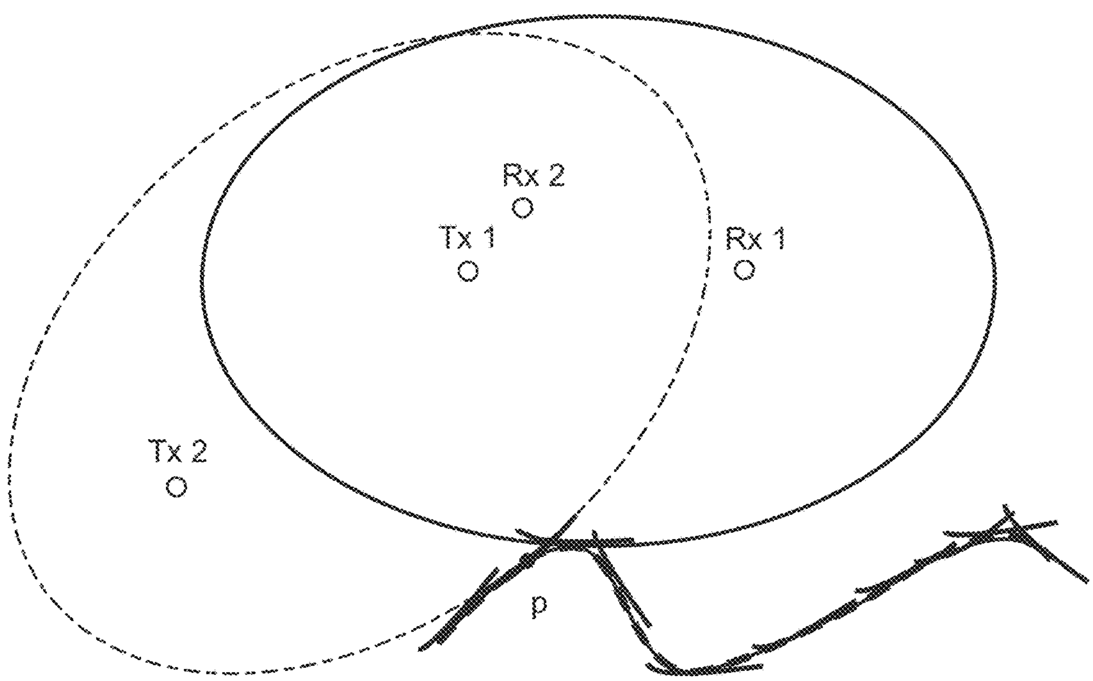
FIG. 17 is a diagram showing an example fitting of a smooth estimate to the ellipse sections.

Subsequently, the sections of the TOF ellipses can be identified for each ellipse and a smooth surface can be fitted through these sections. This step is illustrated in FIG. 17, which is a diagram showing an example fitting of a smooth estimate to the ellipse sections. The new estimated surface may be used in the next iteration and the process may be repeated until the difference between estimates reaches a predetermined threshold.

This estimation method can enforce the estimated surface to be tangent and close to the TOF ellipses while keeping a slowly varying curvature.

Figure 18:
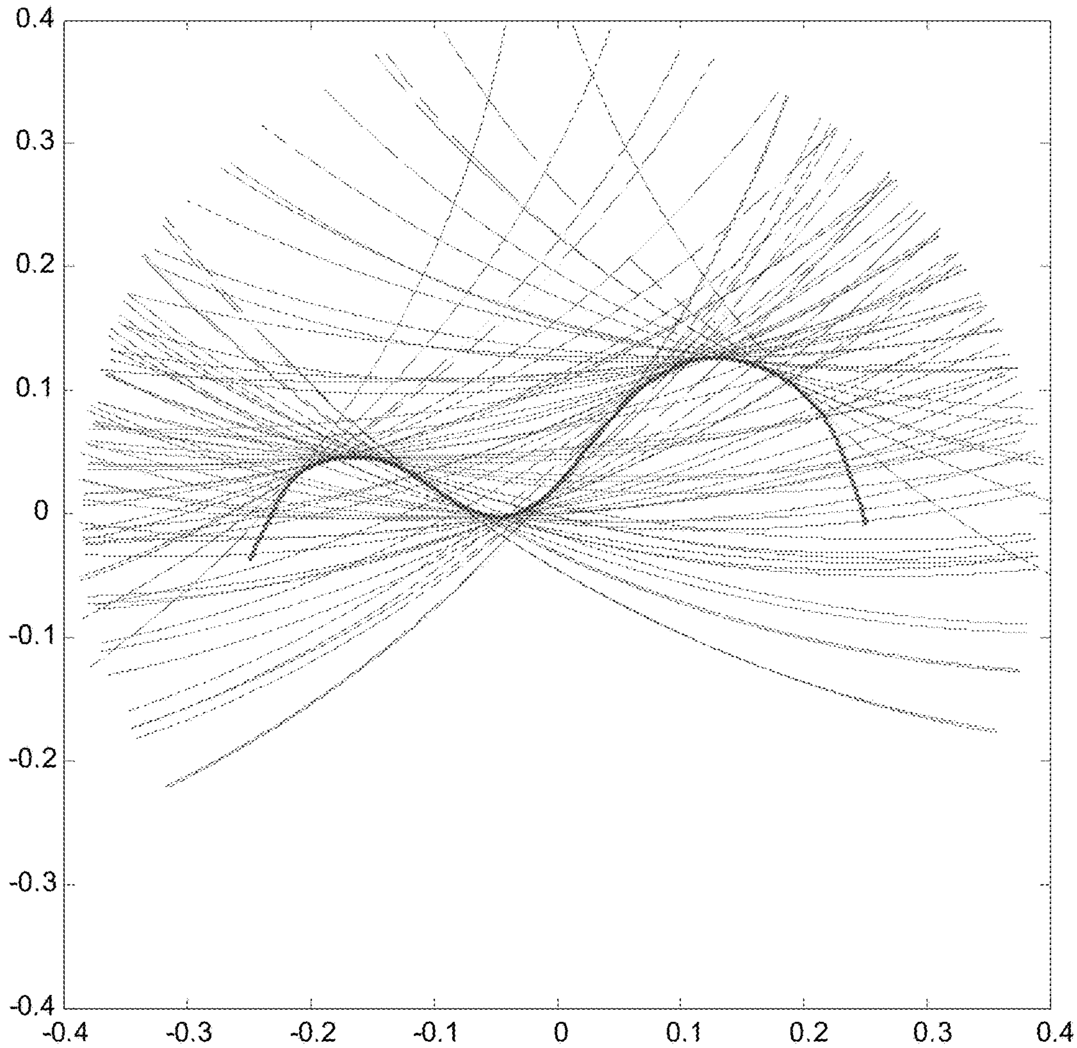
FIG. 18 is an image model showing a smooth surface and the corresponding TOF ellipses.
Figure 19:
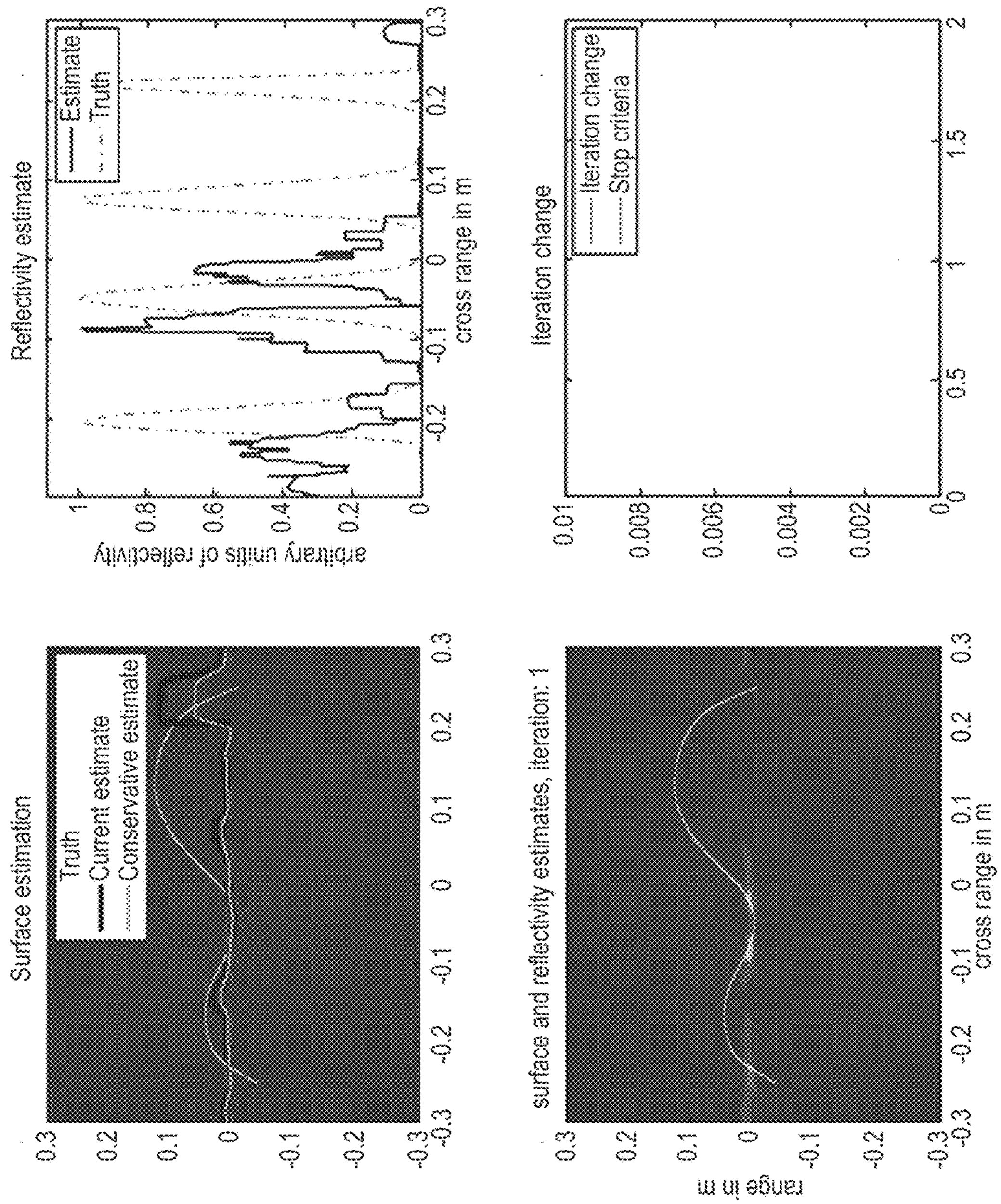
FIG. 19 are graphs depicting an algorithm estimate for iteration 1.
Figure 20:
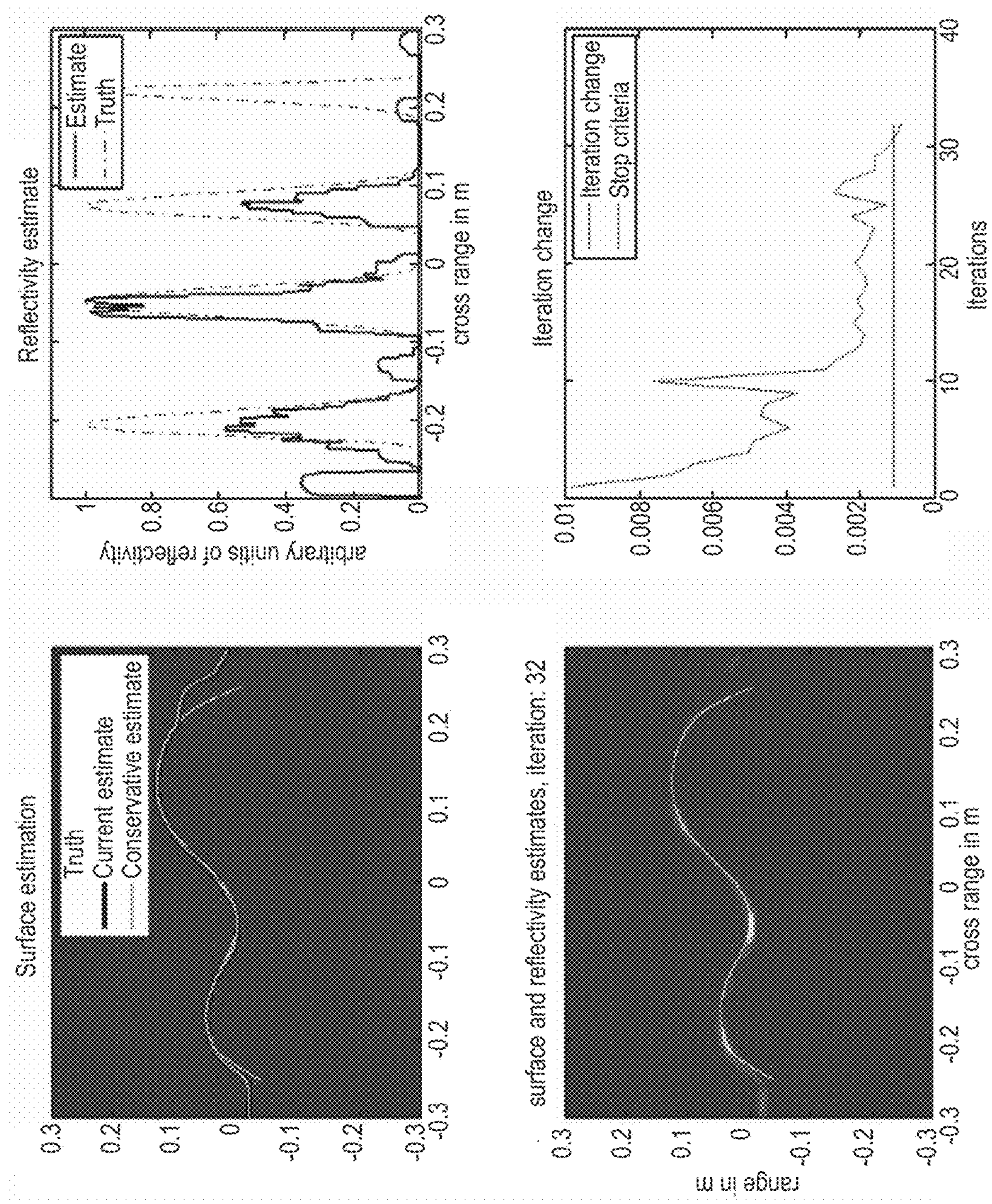
FIG. 20 are graphs showing the estimate after 32 iterations.

In experiments, the estimation method was tested with simulated data from a system with unlimited bandwidth. The unlimited bandwidth case produces TOF estimates that are exact and conform to the specular surface. FIG. 18 illustrates an image model showing a smooth surface and the corresponding TOF ellipses. The surface reflectivity was modulated with 4 reflectivity peaks as demonstrated in FIG. 19 (top right, dashed line), which are graphs depicting an algorithm estimate for iteration 1. FIG. 19 shows the state of the estimate (from random around zero) after the first iteration and FIG. 20 illustrates graphs showing the estimate after 32 iterations. A very close fit is achieved after 32 iterations. The reflectivity estimate is also close around the center peaks and suffers at the edges because of lack of TOF ellipses from those parts.

Figure 21:
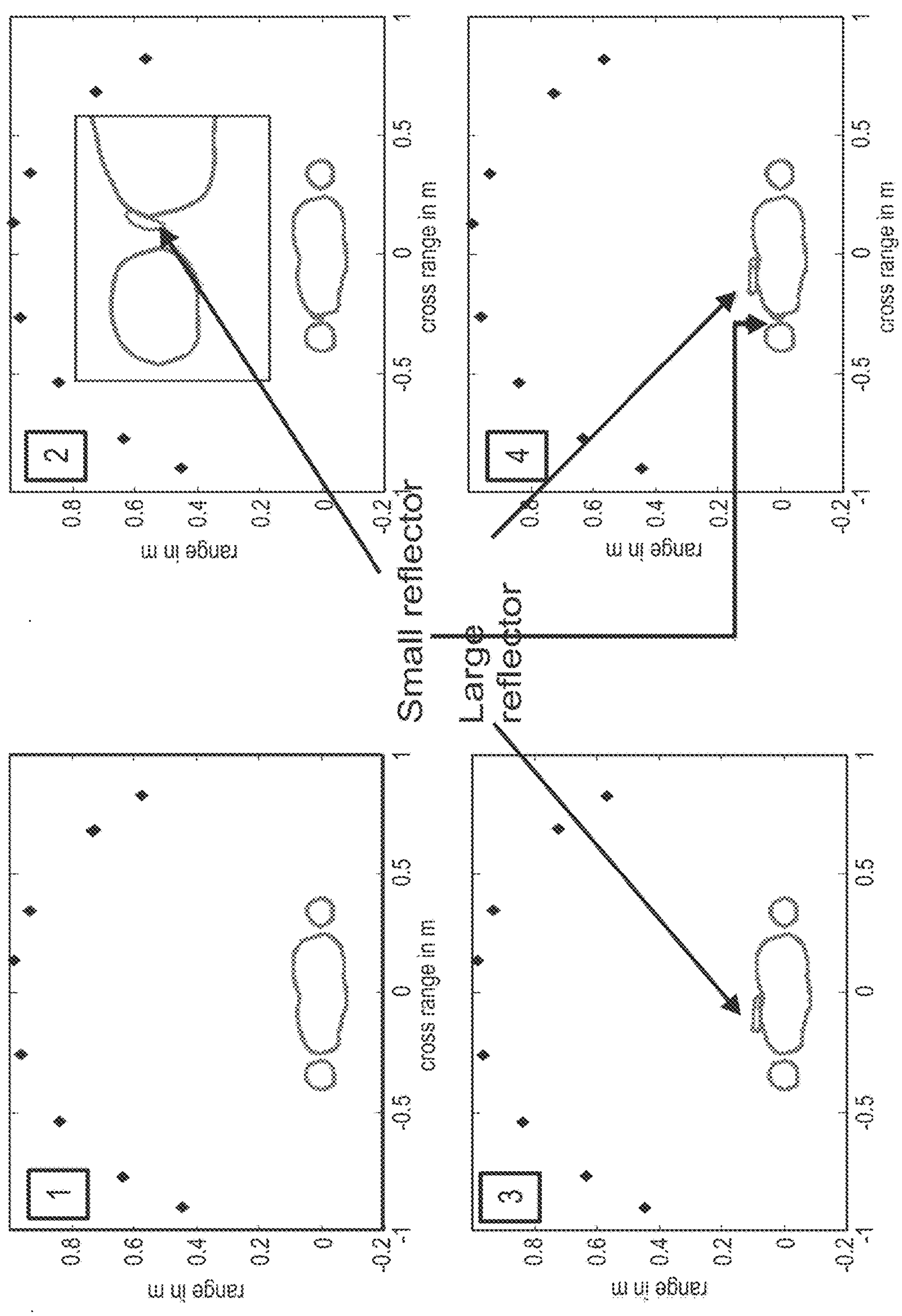
FIG. 21 shows simulated geometries.
Figure 22:
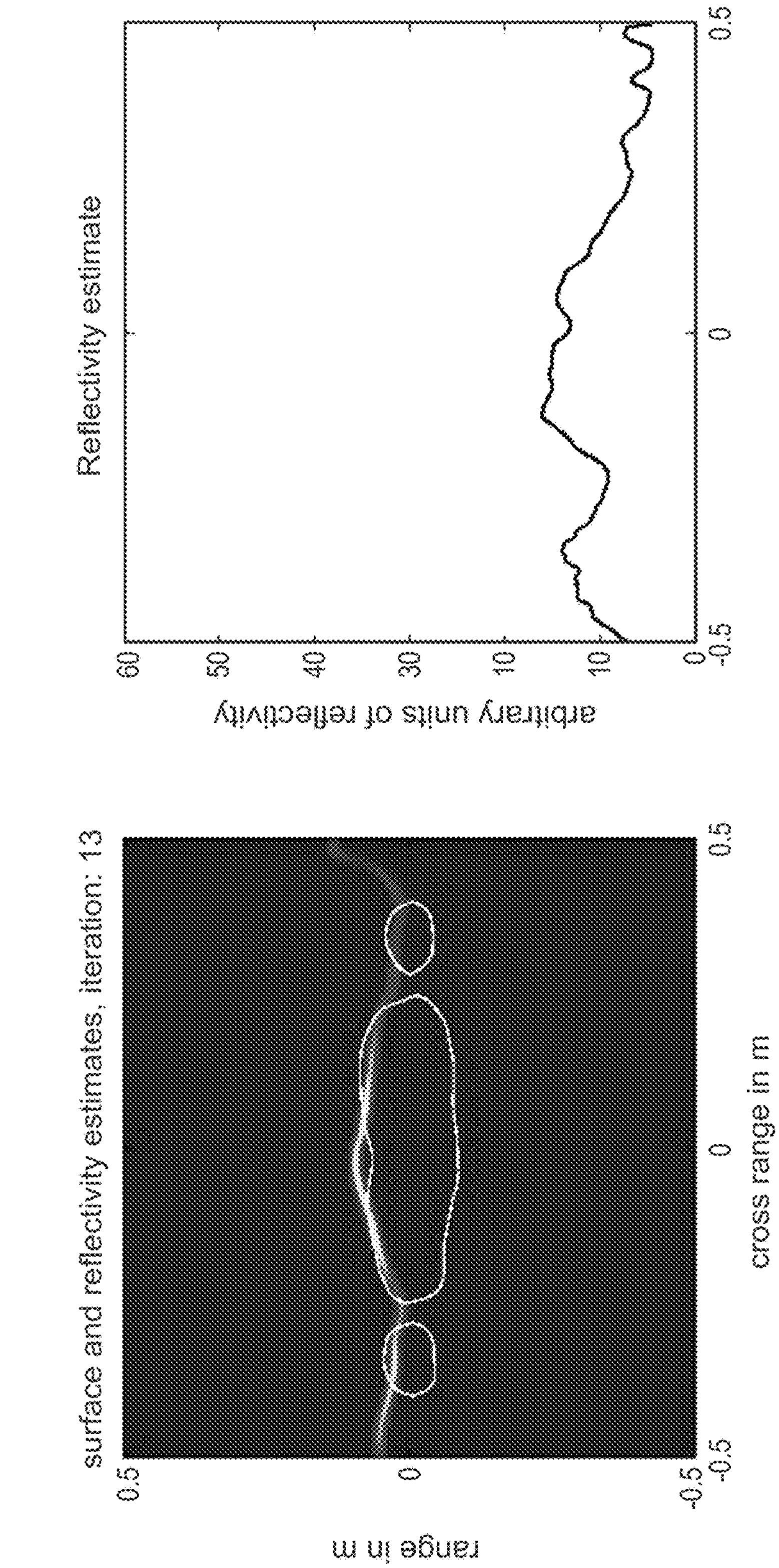
FIG. 22 shows reconstructions for case 1 of FIG. 21.
Figure 23:
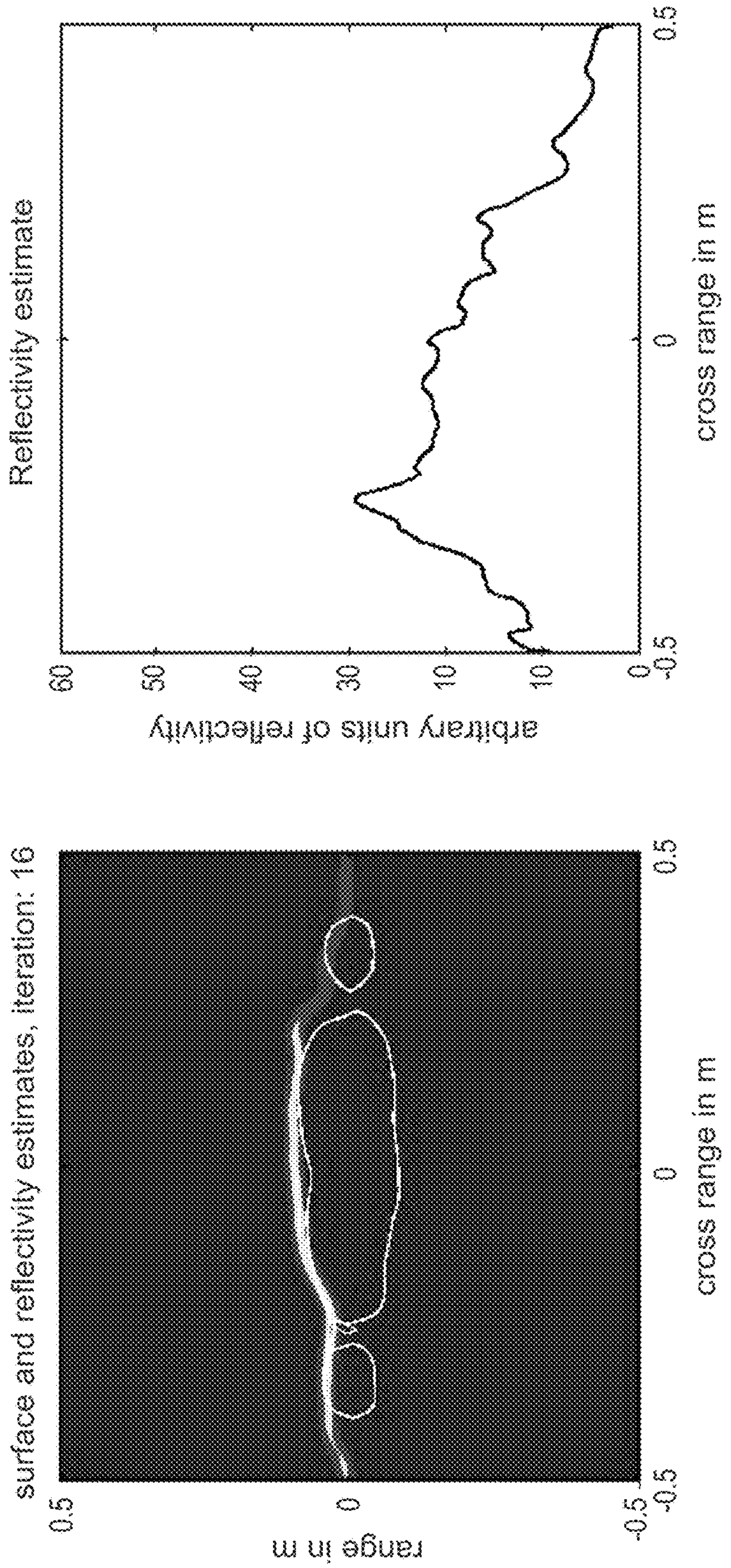
FIG. 23 shows reconstruction for case 2 of FIG. 21.
Figure 24:
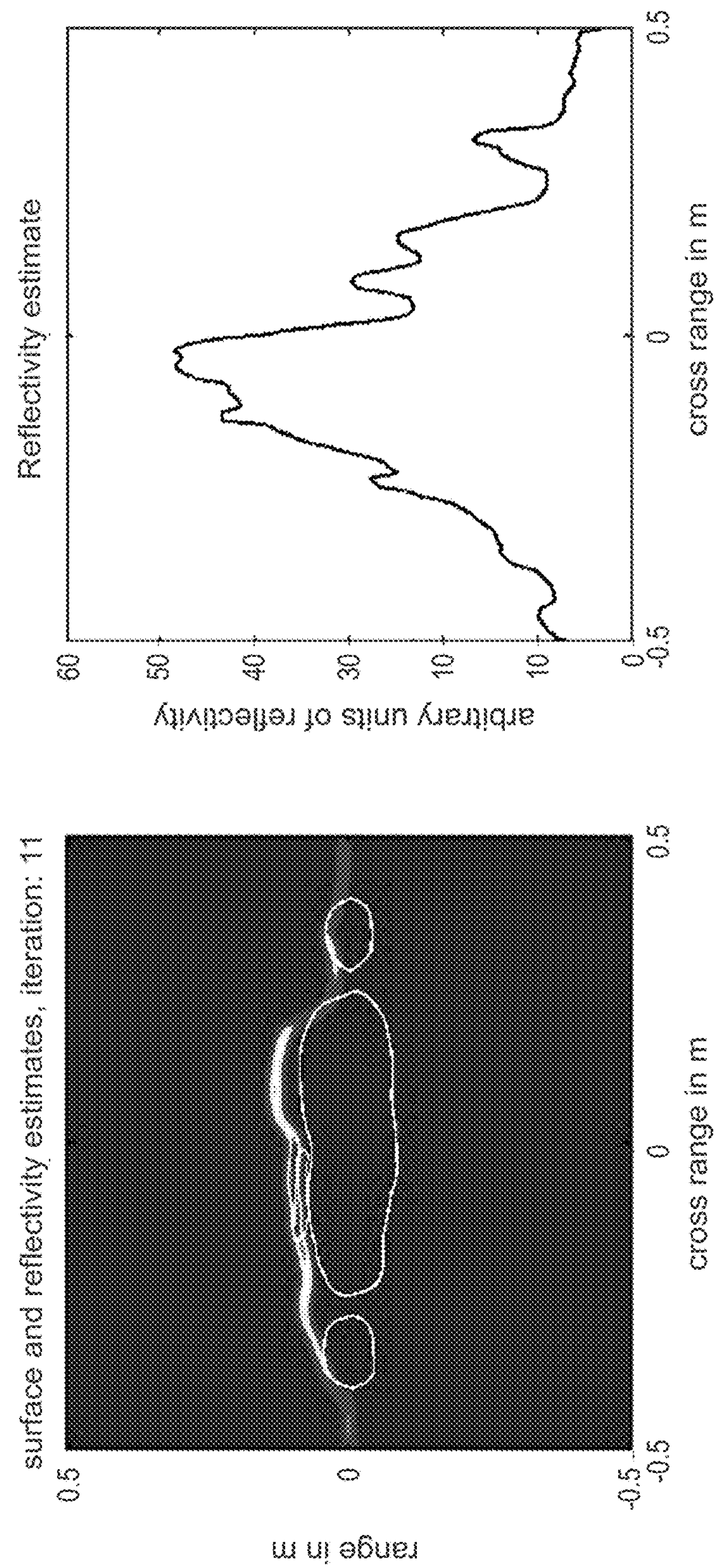
FIG. 24 shows reconstruction for case 3 of FIG. 21.
Figure 25:
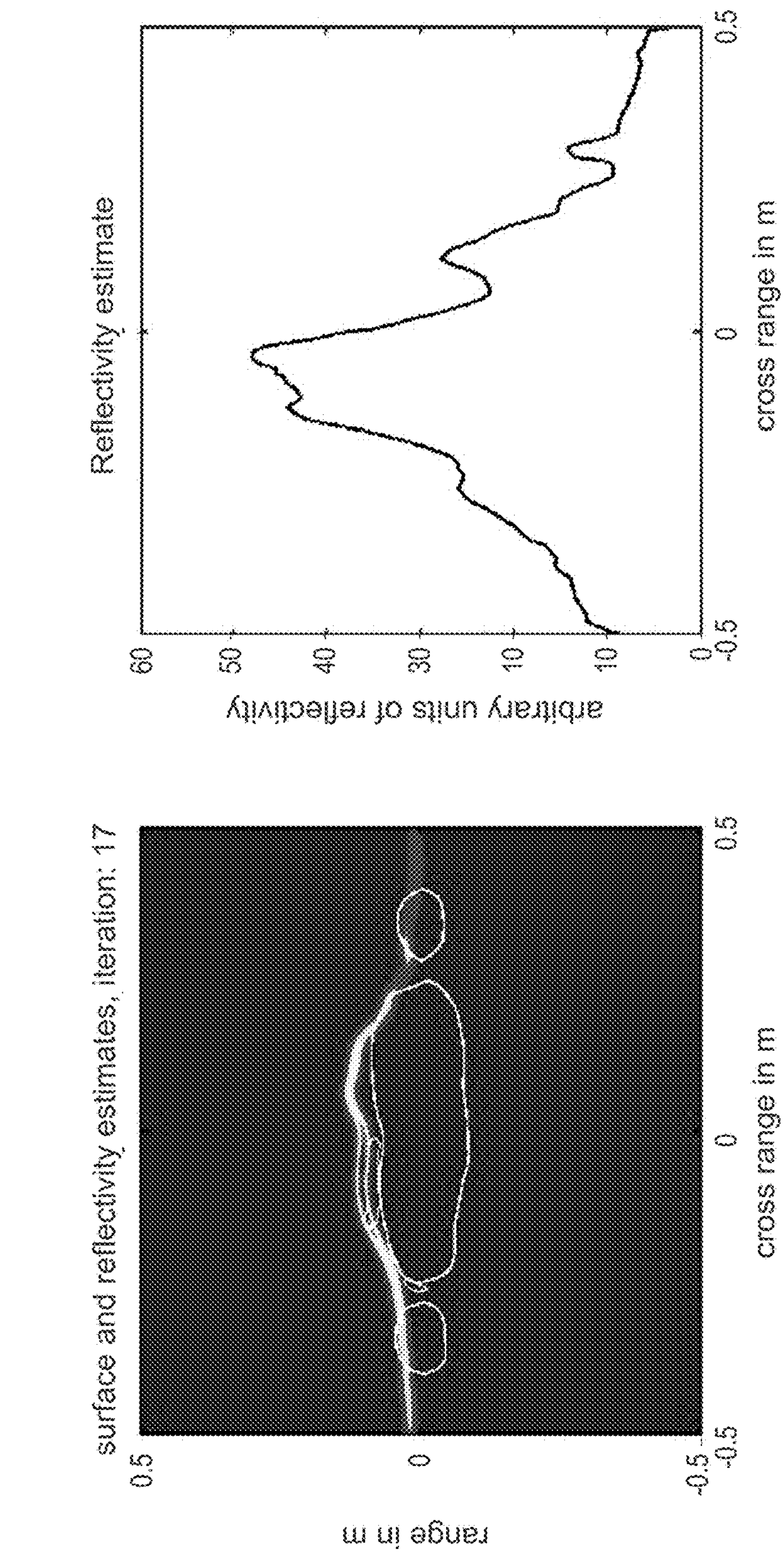
FIG. 25 shows reconstruction for case 4 of FIG. 21.
Figure 26:
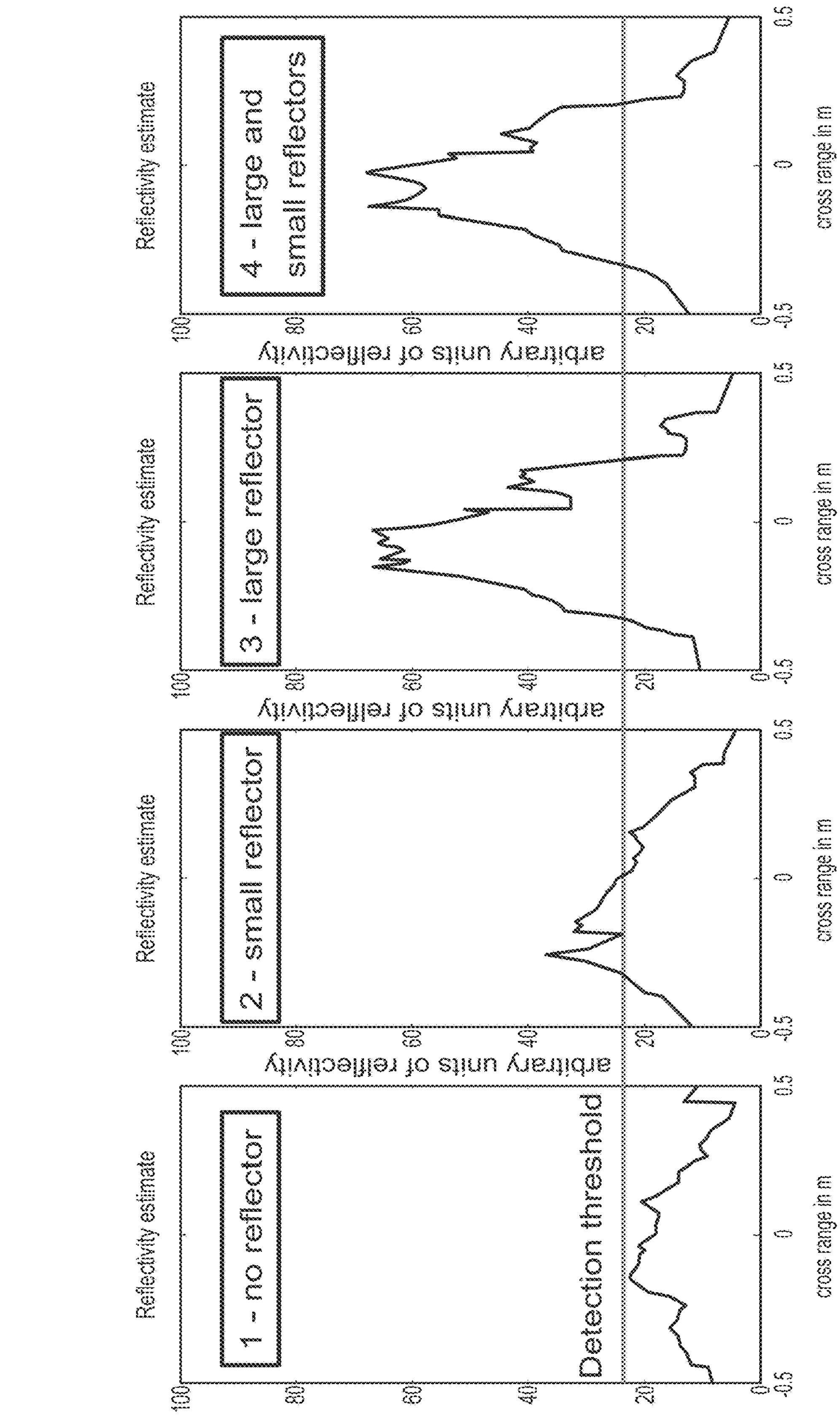
FIG. 26 are graphs depicting the differentiation by reflectivity estimates.

In other experiments, 2D simulations for a limited bandwidth system were performed. The simulated geometries are illustrated in FIG. 21. The cutout of the body (torso and arms) has low reflectivity and the reflectors have high reflectivity. The surface and reflectivity estimates are shown in the graphs of FIGS. 22-25. Particularly, FIG. 22 shows reconstructions for case 1 of FIG. 21. FIG. 23 shows reconstruction for case 2 of FIG. 21. FIG. 24 shows reconstruction for case 3 of FIG. 21. FIG. 25 shows reconstruction for case 4 of FIG. 21. These simulations show good surface and reflectivity estimates. In all the cases, a threshold line can be established that differentiates the cases with reflectors from the case without reflectors. FIG. 26 illustrates graphs depicting the differentiation by reflectivity estimates.

Figure 27:
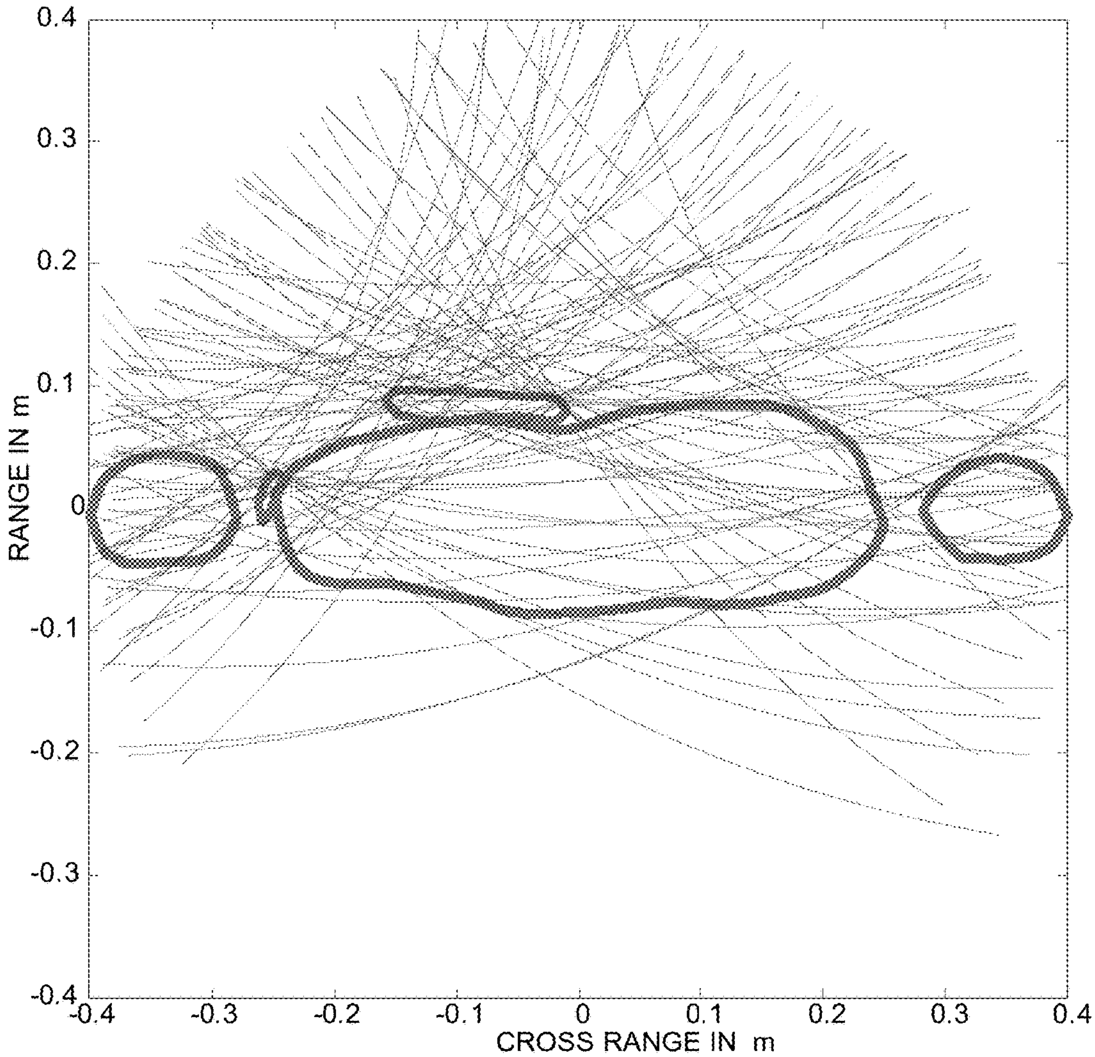
FIG. 27 is an image model showing the TOF ellipses for case 4 of FIG. 21.

The reason that the surface estimate is not as good as for the unlimited bandwidth case is the error in TOF estimation. FIG. 27 illustrates an image model showing the TOF ellipses for case 4 of FIG. 21. It is evident that several of the TOF ellipses are non-conforming to the object surface therefore the estimate will be non-conforming to the object surface. The estimate can clearly benefit from more bandwidth or TOF estimation improvement.

An experiment may be setup to demonstrate the surface and reflectivity estimation and technique in two dimensions. For example, tow low gain horns may be mounted on linear stages. Bistatic measurements of a vertically invariant object can be collected with the use of a network analyzer, and the data can be processes with the surface estimation algorithm.

Other experiments were conducted to validate results from the two dimensional method of moments (2D MOM) simulations that were used during the development of the methods. A 3D vector method of moments (3D MOM) simulation tool was implemented by use of the Matlab software. This tool can support the development of surface estimation methods in three dimensions as well as the virtualizer effort. Some simple validating examples are described herein. In an effort to apply the surface estimation methods to three dimensional surfaces and also to measurements from the Metaimager antenna an estimation method is provided that is based on spline approximation of the object and its reflectivity.

In an experiment, a network analyzer was used as the FMCW radar radio to perform K-Band sweeps from 18 GHz to 26.5 GHz. Two low gain horn antennas were mounted on staggered linear stages capable of synthesizing a 1.5 m bistatic aperture. The horns were separated in the range direction by 0.15 m, and the measurement positions for the receiver and transmitter were chosen from combinations of the following ten array positions given in meters from the edge of the stages: 0.05, 0.23, 0.45, 0.57, 0.82, 0.91, 1.12, 1.25, 1.36 and 1.49. Only the measurements where the position of the sourced and transmitter were different were used because of obscuration. An approximately cylindrical metallic bucket of diameter varying from 0.5 m to 0.6 m was used as a target. The target was placed in front of the stages.

Figure 28:
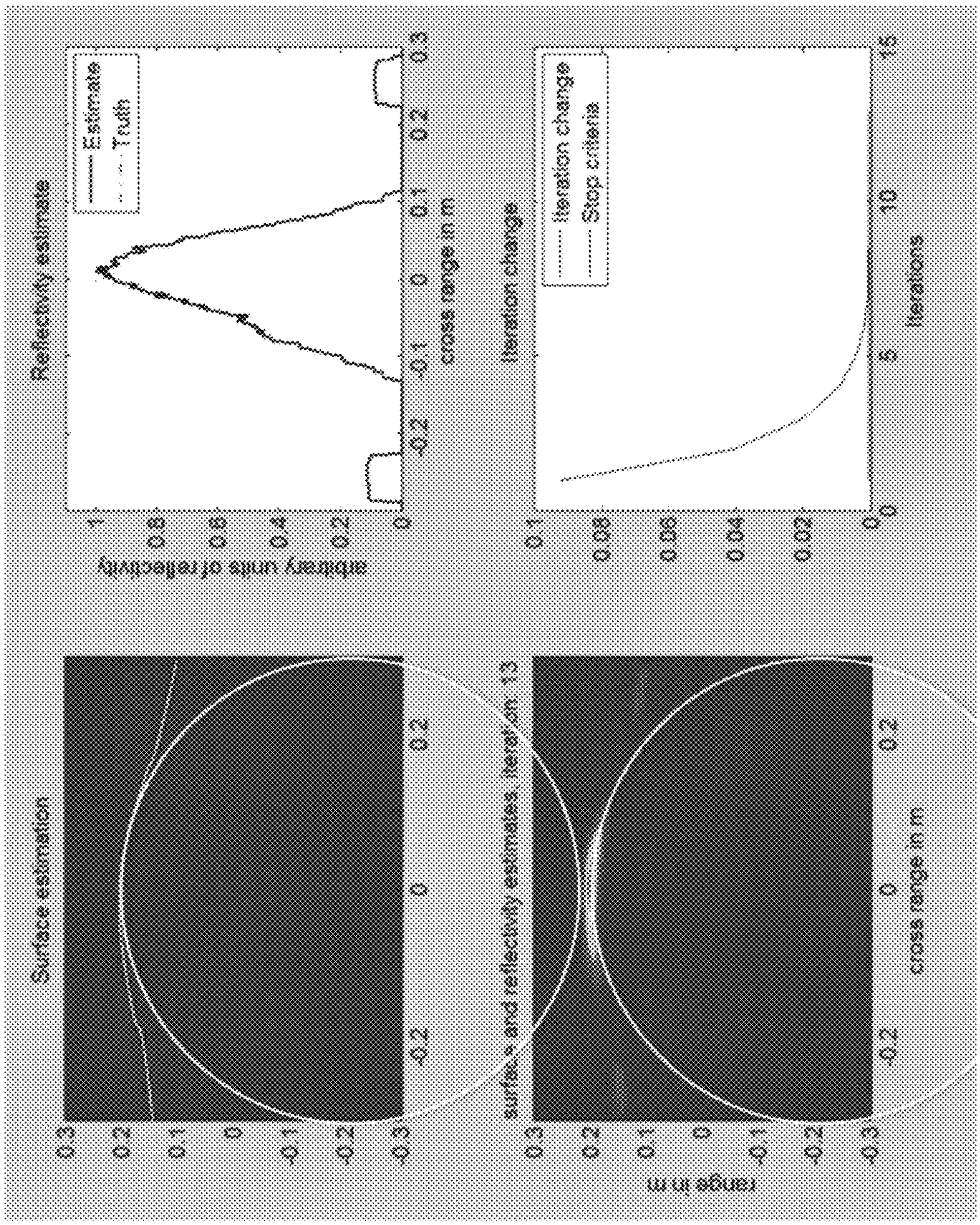
FIG. 28 are images and graphs showing the shape and reflectivity reconstruction when a bucket was positioned approximately 1.5 m from the stages.

FIG. 28 illustrates images and graphs showing the shape and reflectivity reconstruction when a bucket was positioned approximately 1.5 m from the stages. The coordinates in FIG. 28 are centered in the object space. The reflectivity was normalized and is shown in the top right corner of the figure. The part of the bucket between −0.1 m and 0.1 m that is seen by the bistatic pairs (due to specularity) is reconstructed well. This reconstruction results when the target position is approximately 1.5 meters from the measurement plane. The white circle is an approximation of the target based on the reconstruction. The coordinate system is centered in the object plane.

Figure 29:
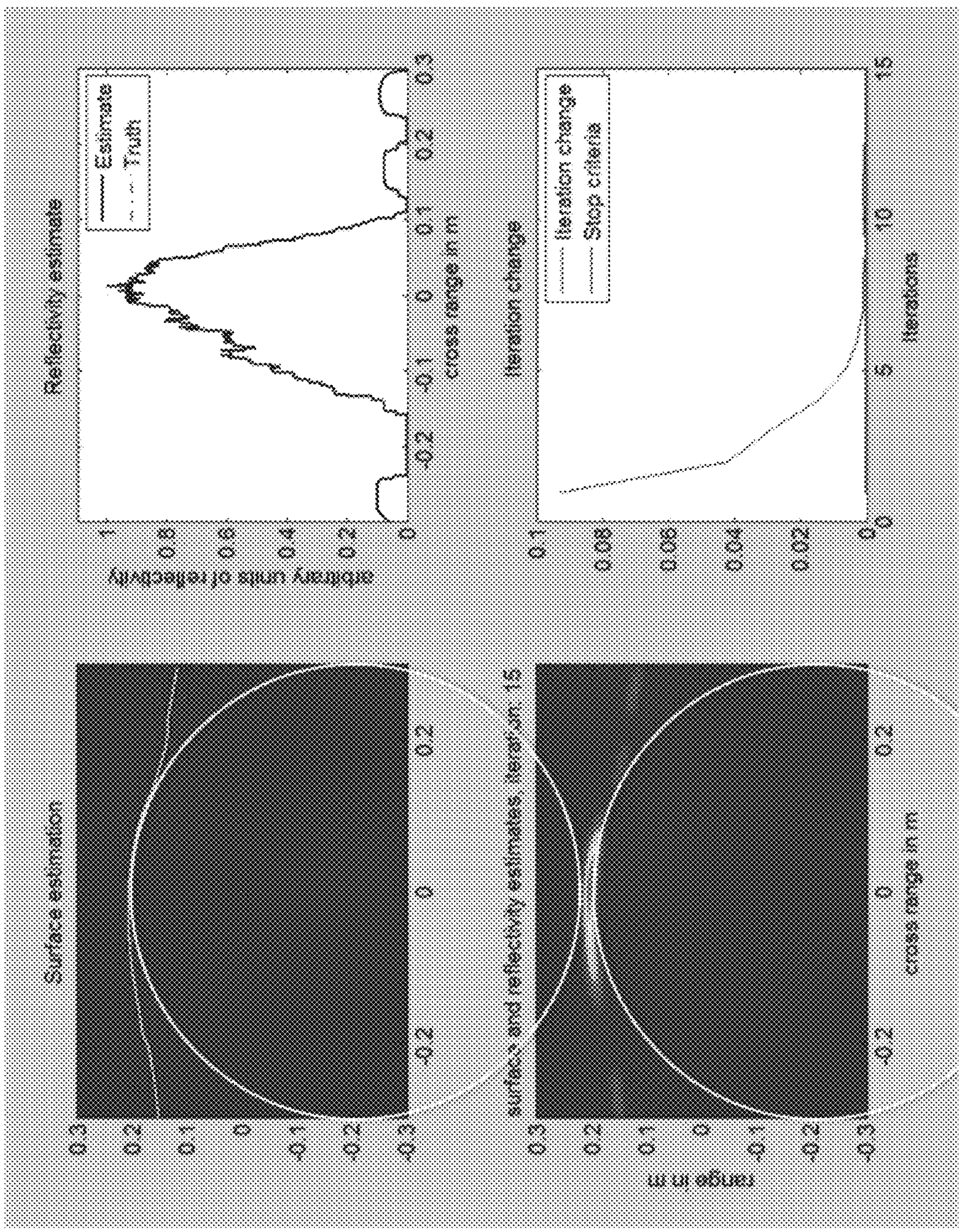
FIG. 29 are images and graphs showing the shape and reflectivity reconstruction when the bucket was positioned approximately 1.3 m from the stages.

FIG. 29 are images and graphs showing the shape and reflectivity reconstruction when the bucket was positioned approximately 1.3 m from the stages. A slight widening of the reflectivity profile is noticeable. As can be expected, this is due to the bistatic measurements measuring more of the specular reflections. Reconstruction results when the target position is approximately 1.3 meters from the measurement plane. The white circle is an approximation of the target based on the reconstruction. The coordinate system is centered in the object plane.

Figure 30:
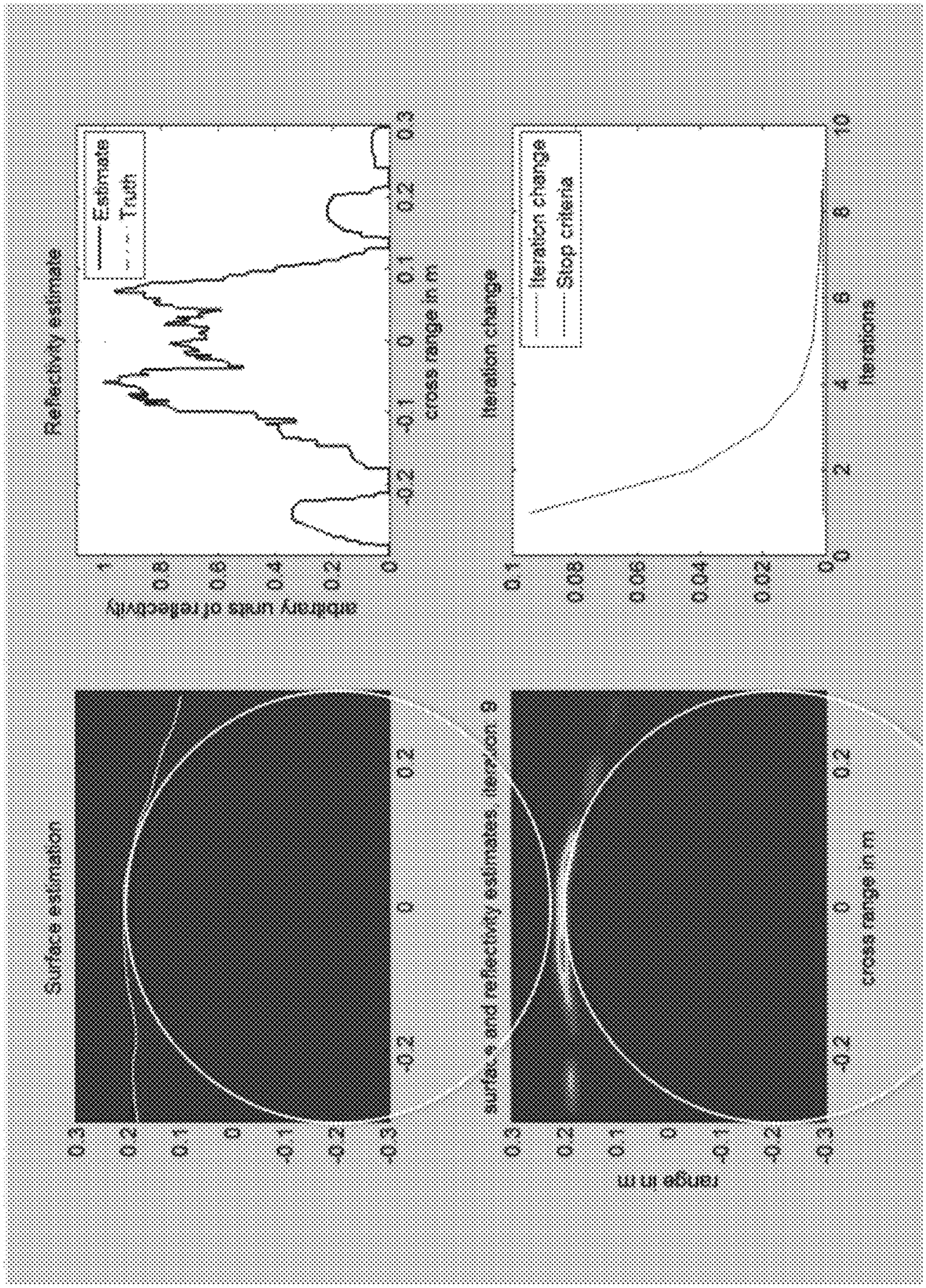
FIG. 30 are graphs and images of reconstruction resulting when the target position is approximately 1.3 m from the measurement plane and a piece of wood is placed in front of the bucket to disturb its reflectivity profile.

A more interesting target is shown in FIG. 30, which illustrates graphs and images of reconstruction resulting when the target position is approximately 1.3 m from the measurement plane and a piece of wood is placed in front of the bucket to disturb its reflectivity profile. The reconstructions are shown in FIG. 30. The reflectivity estimate shows a dip in the center corresponding to the location of the piece of wood.

In accordance with embodiments, imaging can include performing range measurement, detecting signal peak, applying a surface constant, and optimizing the result. The range measurement can be based on high bandwidth method such as frequency modulated continuous wave (FMCW) system or stepped frequency system to ensure high depth resolution. The measurement in Fourier domain contains the desired TOF information.

Signal peak detection is then performed to extract the range information from the frequency domain signal. Due to the noisy nature of coherent detection, sometimes it is hard to accurately find the peak that relates to the range. Therefore, we apply a BPDN algorithm to the measured signal, which is an optimization problem in the form of $$\min_{x} \frac{1}{2}\|y - Dx\|_2^2 + \lambda\|x\|_1 \tag{6}$$

where y is the measurement and x is the desired solution. For a reflected FMCW signal swept over a bandwidth of B, an over complete dictionary D with frequency response from sub-resolution distance is constructed. The λ parameter can control the quality of the optimized solution in favor of either accuracy, i.e. the least square error, or sparsity of the solution. The BPDN problem is then solved using available solver such as TwIST to extract the peak. The key part of our algorithm is applying surface constraint to the measured time of flight information, weighing points on each ellipse according to their possibility of being part of the target surface. For each point on the ellipse, an estimated set of TOF forward measurements can be made by calculating the round trip distance between the point and the transceivers. The difference between the estimated TOF and the measured TOF can be compared to weigh these points. The signal strength can also be used in such a way to estimate the reflectivity profile.

To make the method more efficient, the surface prior can be used to help constrain the model. This surface prior can be obtained through depth camera such as the Microsoft Kinect as a rough estimation of the reflecting surface, assuming the visible surface is close to the surface reflecting millimeter wave. For each point $p_i$ on the surface prior, the round trip distance to each bistatic pair may be calculated. The weight function characterizes the difference between the calculated round trip distance and the measured TOF is shown in the first part of the equation in Equation 7. Here L denotes that total travel distance derived from time of flight. In this equation, $l_{TX}^{i}$ and $l_{RX}^{i}$ denotes distance between $p_i$ to the transceiver and receiver, respectively. Since each set of transceiver pair corresponds to an ellipse that do not have a matching time of flight.

$$\begin{aligned}\omega_i^m &= d_i^m \\ &= \frac{a}{(\|L-(l_{TX}^i + l_{RX}^i)\| + \lambda)^{\beta}} + \frac{b}{(\|\Delta\theta_i\| + \lambda)^{\gamma}}\end{aligned} \tag{7}$$

Similarly, another weight can be made and described by the second part of Equation 7, where Δθ is the difference between the tangent angle at point $p_i$ and the angle of incident plane if $p_i$ were to reflect with a certain transceiver pair. Therefore, the total weight described in Equation 7 can help select the ellipses that are the best estimation at each point on the prior. With this weighing function, only points sampled on the surface prior may be tested, which can save a lot of computation.

The result can be further optimized by using iterative techniques. Initially, the estimated surface can be represented as a piece-wise smooth spline with control points, which serve as the supports for the merit function. The merit function can be defined as the difference between the simulated TOF and the measured TOF. In experiments, the Levenberg-Marquardt algorithm was used to calculate the steps needed for the merit function to converge.

To demonstrate the ability of the technique to estimate surface geometry and reflectivity, an experiment was conducted for imaging a reflective surface. In this experiment, the system operated in K-Band sweeping from 18 GHz to 26.5 GHz to form FMCW measurements. To simulate an array of bistatic receivers, a transmitter and receiver were set on a linear stage and controlled to perform bistatic measurement and each position. In order to have the maximum variations for the TOF information, the transceiver locations were arranged randomly. The effective aperture for the system is 1.5 m. The target object was an aluminum bucket located 1.3 m away from the system. The measurement technique is described by FIGS. 31A-31D.

Figure 31B:
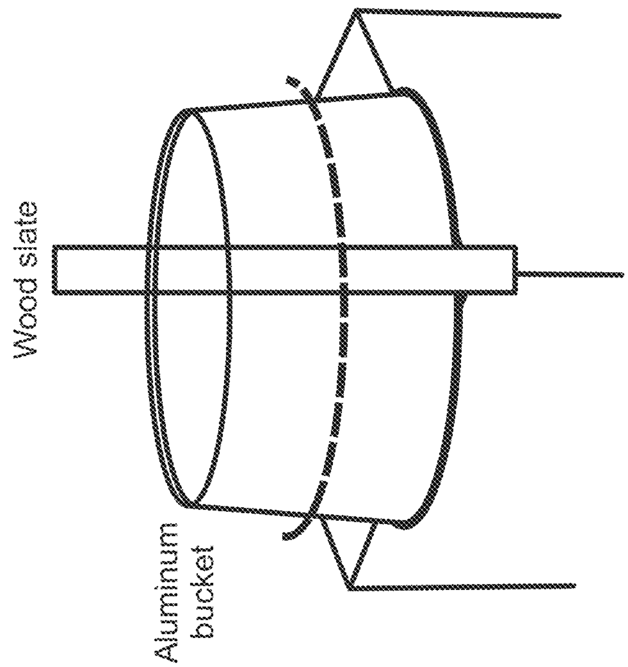
FIG. 31B is an image showing the target objects, an aluminum bucket and wood slate.
Figure 31A:
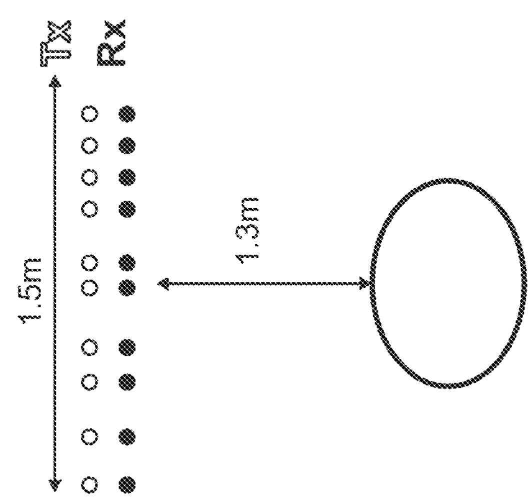
FIG. 31A illustrates a diagram of the measurement setup.

FIG. 31A illustrates a diagram of the measurement setup. Referring to FIG. 31A, the top row of dots represent the location for the transmitter, and the bottom row of dots represent the location for the receiver.

FIG. 31B is an image showing the target objects, an aluminum bucket and wood slate. The wood slate is placed in front of the aluminum bucket to produce reflectivity variation.

Figure 31C:
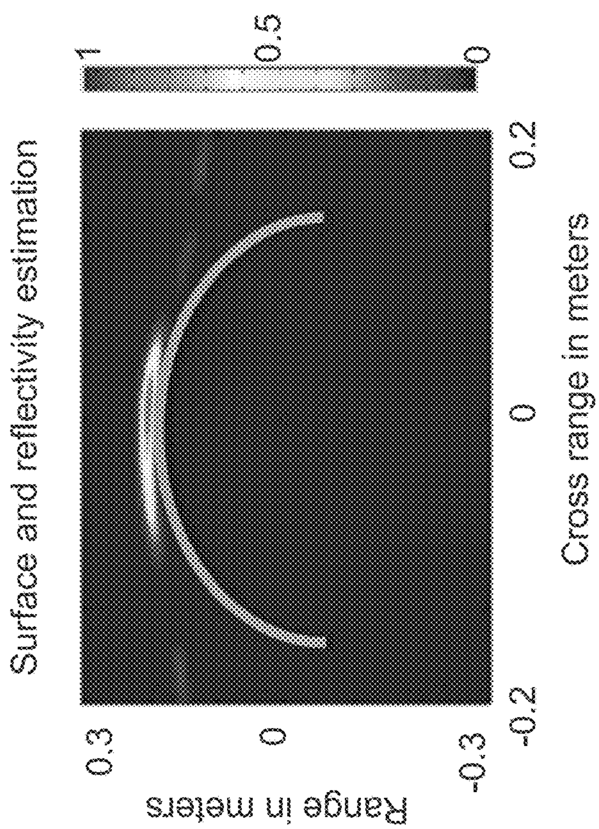
FIG. 31C illustrates an image of 2D surface profile reconstructed with normalized reflectivity.

FIG. 31C illustrates an image of 2D surface profile reconstructed with normalized reflectivity. In this case, only the bucket is being imaged.

Figure 31D:
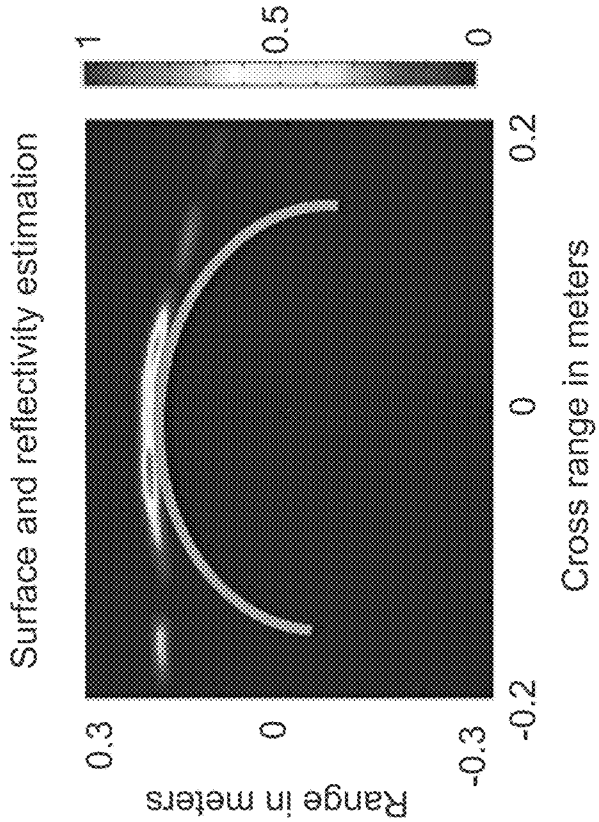
FIG. 31D illustrates an image of a reconstructed 2D surface profile of the bucket with a wood slate in front.

FIG. 31D illustrates an image of a reconstructed 2D surface profile of the bucket with a wood slate in front.

The result of the surface estimation and the reflectivity estimation is shown in FIG. 31C. To demonstrate the ability to reconstruct the reflectivity variation, the same bucket was imaged with a ruler made of wood placed in front. FIG. 31D shows the result of the estimation of the changed reflectivity profile.

The techniques disclosed herein may be used to implement inexpensive, simple to deploy imaging systems for portal security such as at airport check points, building of importance check point, event checkpoint, and the like. The imaging methods disclosed herein can also be used to implement imagers for non-destructive inspection in industrial and research (e.g., archeology and art) applications.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. An imaging system comprising:

a plurality of bistatic radar sensors configured to transmit electromagnetic waves towards a surface of a target object and to measure the electromagnetic waves reflected from the surface of the target object; and a computing device comprising at least one processor and memory configured to:

determine time of flight (TOF) estimates based on the measured electromagnetic waves;

draw, within an image model for the target object, a plurality of candidate surface portions of the surface of the target object based on the TOF estimates and predetermined positions of the bistatic radar sensors;

assign weights to each of the candidate surface portions;

determine points in the image model where the candidate surface portions meet with a predetermined probability based on the weights; and define an estimated surface of the target object in the image model based on the determined points, wherein the computing device, for assigning the weights to each of the candidate surface portions, is configured to:

place a plurality of test ellipses in the image model, each test ellipse being tangent to a different portion of the candidate surface portions;

calculate TOFs from predetermined positions of the bistatic radar sensors; and determine distances between the calculated TOFs and the determined TOF estimates, wherein the weights are assigned based on the determined distances, higher weights being assigned to closer distances.

2. The imaging system of claim 1, wherein the computing device is configured to use the estimated surface to display an image of the target object.

3. The imaging system of claim 1, wherein the bistatic sensors are positioned in a predetermined orientation and distance with respect to each other.

4. The imaging system of claim 1, wherein the bistatic sensors are positioned one of with regular spacing, with Golomb ruler spacing, with random spacing, on a plane facing the target object, and around the target object.

5. The imaging system of claim 1, wherein the bistatic radar sensors are configured to operate in a Frequency Modulated Continuous Wave (FMCW) mode to sweep the electromagnetic wave across a predetermined bandwidth.

6. The imaging system of claim 1, wherein the candidate surface portions are one of a portion of an ellipse and a portion of an ellipsoid.

7. The imaging system of claim 1, wherein the computing device is configured to smooth the determined points for defining the estimate surface of the target object.

8. The imaging system of claim 1, wherein the image model is one of a two-dimensional image model and a three-dimensional image model.

9. The imaging system of claim 1, wherein the computing device is configured to determine a reflectivity of the surface of the target object based on the estimated surface and the measured electromagnetic waves.

10. The imaging system of claim 1, wherein the test ellipse is a circle.

11. The imaging system of claim 1, further comprising a display configured to display a representation of the estimated surface of the target object.

12. A method comprising:
- transmitting electromagnetic waves towards a surface of a target object;
- measuring the electromagnetic waves reflected from the surface of the target object;
- determining time of flight (TOF) estimates based on the measured electromagnetic waves;
- drawing, within an image model for the target object, a plurality of candidate surface portions of the surface of the target object based on the TOF estimates and predetermined positions of the bistatic radar sensors;
- assigning weights to each of the candidate surface portions;
- determining points in the image model where the candidate surface portions meet with a predetermined probability based on the weights; and defining an estimated surface of the target object in the image model based on the determined points;
- placing a plurality of test ellipses in the image model, each test ellipse being tangent to a different portion of the candidate surface portions;
- calculating TOFs from predetermined positions of bistatic radar sensors; and
- determining distances between the calculated TOFs and the determined TOF estimates,
- wherein the weights are assigned based on the determined distances, higher weights being assigned to closer distances.

13. The method of claim 12, further comprising using the estimated surface to display an image of the target object.

14. The method of claim 12, wherein transmitting electromagnetic waves and measuring the electromagnetic waves comprises using a plurality of bistatic sensors positioned in a predetermined orientation and distance with respect to each other.

15. The method of claim 14, wherein the bistatic sensors are positioned one of with regular spacing, with Golomb ruler spacing, with random spacing, on a plane facing the target object, and around the target object.

16. The method of claim 14, wherein the bistatic radar sensors are configured to operate in a Frequency Modulated Continuous Wave (FMCW) mode to sweep the electromagnetic wave across a predetermined bandwidth.

17. The method of claim 12, wherein the candidate surface portions are one of a portion of an ellipse and a portion of an ellipsoid.

18. The method of claim 12, further comprising smoothing the determined points for defining the estimate surface of the target object.

19. The method of claim 12, wherein the image model is one of a two-dimensional image model and a three-dimensional image model.

20. The method of claim 12, wherein transmitting electromagnetic waves and measuring the electromagnetic waves comprises using a plurality of bistatic sensors, and
- wherein the method further comprises determining a reflectivity of the surface of the target object based on the estimated surface and the measured electromagnetic waves.

21. The method of claim 12, wherein transmitting electromagnetic waves and measuring the electromagnetic waves comprises using a plurality of bistatic sensors, and
- wherein the plurality of bistatic radar sensors comprise a plurality of transmitter and receiver pairs,
- wherein the method comprises, for each transmitter and receiver pair:
  - determining a TOF estimate;
  - drawing, within the image model, a candidate ellipse for the surface of the target object based on the TOF estimate and the predetermined position of the transmitter and receiver pair; and
  - assigning weights to the candidate ellipse; and
- wherein the computing device is configured to:
  - determining points in the image model where the candidate ellipses meet with a predetermined probability based on the weights; and
  - defining an estimated surface of the target object in the image model based on the determined points where the candidate ellipses meet with the predetermined probability.

22. The method of claim 12, wherein the test ellipse is a circle.

23. The method of claim 12, further comprising displaying a representation of the estimated surface of the target object.

* * * * *